United States Patent
Roumi et al.

(10) Patent No.: US 10,903,668 B2
(45) Date of Patent: *Jan. 26, 2021

(54) SYSTEMS AND METHODS FOR MANAGEMENT AND MONITORING OF ENERGY STORAGE AND DISTRIBUTION

(71) Applicant: CALIFORNIA INSTITUTE OF TECHNOLOGY, Pasadena, CA (US)

(72) Inventors: Mahshid Roumi, Pasadena, CA (US); Farshid Roumi, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,424

(22) Filed: Jul. 8, 2019

(65) Prior Publication Data

US 2020/0006962 A1  Jan. 2, 2020

Related U.S. Application Data

(63) Continuation of application No. 14/975,336, filed on Dec. 18, 2015, now Pat. No. 10,389,141.
(Continued)

(51) Int. Cl.
*H02J 7/00* (2006.01)
*H02J 13/00* (2006.01)

(52) U.S. Cl.
CPC .............. *H02J 7/0021* (2013.01); *H02J 7/00* (2013.01); *H02J 7/00034* (2020.01);
(Continued)

(58) Field of Classification Search
CPC ....... H02J 7/0031; H02J 7/0047; Y02E 60/12; G01R 31/3648; H01M 10/48
(Continued)

(56) References Cited

U.S. PATENT DOCUMENTS 5,146,170 A   9/1992   Ishikawa et al.
5,298,346 A   3/1994   Gyenes
(Continued)

FOREIGN PATENT DOCUMENTS

JP   2002-008631 A   1/2002

OTHER PUBLICATIONS

U.S. Appl. No. 13/229,479, filed Sep. 9, 2011.
(Continued)

*Primary Examiner* — Arun C Williams
(74) *Attorney, Agent, or Firm* — Leydig, Voit & Mayer, Ltd.

(57) ABSTRACT

A plurality of battery packs is provided in communication with an energy monitoring and control system. Each battery pack includes a plurality of battery cells that collectively dictate the capabilities of the battery pack. The energy monitoring and control system determines a plurality of pack charging or pack discharging parameters for each battery pack that, when performed, achieve one or more performance metrics at a user level (e.g., performance metrics of each battery pack within a system of multiple battery packs). The battery pack further determines a plurality of cell charging or cell discharging parameters for each battery cell based upon the determined plurality of pack charging or pack discharging parameters for each battery cell that, when performed, achieve one or more performance metrics at a battery level (e.g., performance metrics of different cells of each battery pack).

13 Claims, 16 Drawing Sheets

Related U.S. Application Data

(60) Provisional application No. 62/147,372, filed on Apr. 14, 2015, provisional application No. 62/094,821, filed on Dec. 19, 2014, provisional application No. 62/128,833, filed on Mar. 5, 2015.

(52) U.S. Cl.
CPC ... *H02J 13/0003* (2013.01); *H02J 2007/0067* (2013.01); *H02J 2207/40* (2020.01); *Y02T 10/70* (2013.01)

(58) Field of Classification Search
USPC .......................................................... 320/136
See application file for complete search history.

(56) References Cited

U.S. PATENT DOCUMENTS

| | | | |
|---|---|---|---|
| 5,504,415 | A | 4/1996 | Podrazhansky et al. |
| 5,821,759 | A | 10/1998 | Scaman et al. |
| 5,889,385 | A * | 3/1999 | Podrazhansky ....... H02J 7/0016 320/130 |
| 6,078,165 | A | 6/2000 | Ashtiani et al. |
| 6,118,248 | A | 9/2000 | Gartstein et al. |
| 6,160,382 | A | 12/2000 | Yoon et al. |
| 6,229,305 | B1 | 5/2001 | Logue |
| 6,268,713 | B1 | 7/2001 | Thandiwe |
| 6,285,185 | B1 | 9/2001 | Asjes |
| 6,462,551 | B1 | 10/2002 | Coates et al. |
| 6,526,361 | B1 | 2/2003 | Jones et al. |
| 6,841,291 | B2 | 1/2005 | Minamiura |
| 7,088,075 | B2 | 8/2006 | Baba et al. |
| 7,471,066 | B2 | 12/2008 | Ambrosio et al. |
| 7,619,417 | B2 | 11/2009 | Klang |
| 7,834,620 | B2 | 11/2010 | Kejik et al. |
| 8,058,876 | B2 | 11/2011 | Cernasov et al. |
| 8,173,284 | B2 | 5/2012 | Wu et al. |
| 8,179,139 | B2 | 5/2012 | Kawasumi et al. |
| 8,334,699 | B2 | 12/2012 | Asakura et al. |
| 8,618,775 | B2 | 12/2013 | Hermann et al. |
| 8,723,482 | B2 | 5/2014 | Dao et al. |
| 8,901,888 | B1 | 12/2014 | Beckman |
| 9,379,368 | B2 | 6/2016 | Roumi |
| 9,658,292 | B2 | 5/2017 | Roumi et al. |
| 10,389,141 | B2 | 8/2019 | Roumi et al. |
| 2004/0217739 | A1* | 11/2004 | Cummings ........... H02J 7/0054 320/137 |
| 2005/0077878 | A1* | 4/2005 | Carrier ...................... B25F 5/00 320/134 |
| 2006/0061365 | A1 | 3/2006 | Lee |
| 2006/0071634 | A1* | 4/2006 | Meyer ..................... H02J 7/041 320/112 |
| 2008/0042654 | A1 | 2/2008 | Kato |
| 2008/0272742 | A1 | 11/2008 | Hart et al. |
| 2009/0015203 | A1 | 1/2009 | Oakes |
| 2009/0039833 | A1 | 2/2009 | Kitagawa |
| 2009/0096424 | A1 | 4/2009 | Ambrosio et al. |
| 2009/0140742 | A1 | 6/2009 | Koch et al. |
| 2009/0184686 | A1 | 7/2009 | Owens, Jr. et al. |
| 2010/0036285 | A1 | 2/2010 | Govari et al. |
| 2010/0201320 | A1 | 8/2010 | Coe et al. |
| 2010/0253373 | A1 | 10/2010 | Kawashima |
| 2010/0324746 | A1 | 12/2010 | Jeong |
| 2011/0060538 | A1 | 3/2011 | Fahimi et al. |
| 2011/0074432 | A1 | 3/2011 | Tinnemeyer |
| 2011/0125336 | A1 | 5/2011 | Groves et al. |
| 2011/0156641 | A1 | 6/2011 | Kishiyama et al. |
| 2011/0187377 | A1 | 8/2011 | Boysen et al. |
| 2011/0316553 | A1 | 12/2011 | Taguchi et al. |
| 2012/0019238 | A1 | 1/2012 | Eichardt et al. |
| 2012/0077095 | A1 | 3/2012 | Roumi et al. |
| 2012/0107680 | A1 | 5/2012 | Amiruddin et al. |
| 2012/0148880 | A1 | 6/2012 | Schaefer et al. |
| 2012/0180126 | A1 | 7/2012 | Liu et al. |
| 2012/0316814 | A1 | 12/2012 | Rahaman et al. |
| 2013/0017432 | A1 | 1/2013 | Roumi |
| 2013/0057288 | A1 | 3/2013 | Ogata et al. |
| 2013/0069661 | A1 | 3/2013 | Rich et al. |
| 2013/0162258 | A1 | 6/2013 | Patin et al. |
| 2013/0189592 | A1 | 7/2013 | Roumi et al. |
| 2013/0229156 | A1 | 9/2013 | Brandon et al. |
| 2013/0253715 | A1 | 9/2013 | Cho et al. |
| 2013/0285616 | A1 | 10/2013 | Washiro |
| 2013/0295439 | A1 | 11/2013 | Masarapu et al. |
| 2013/0316641 | A1 | 11/2013 | Aaron |
| 2014/0002027 | A1 | 1/2014 | Guan |
| 2014/0350716 | A1 | 11/2014 | Fly et al. |
| 2015/0048785 | A1 | 2/2015 | Roohparvar et al. |
| 2015/0072181 | A1 | 3/2015 | Roohparvar |
| 2015/0171398 | A1 | 6/2015 | Roumi |
| 2015/0180000 | A1 | 6/2015 | Roumi |
| 2016/0013463 | A1 | 1/2016 | Roumi et al. |
| 2016/0254514 | A1 | 9/2016 | Roumi |
| 2017/0108552 | A1 | 4/2017 | Roumi et al. |

OTHER PUBLICATIONS

U.S. Appl. No. 13/545,683, filed Jul. 10, 2012.
U.S. Appl. No. 13/724,479, filed Dec. 21, 2012.
U.S. Appl. No. 13/738,835, filed Jan. 10, 2013.
U.S. Appl. No. 14/211,381, filed Mar. 14, 2014.
U.S. Appl. No. 14/546,472, filed Nov. 18, 2014.
U.S. Appl. No. 14/546,953, filed Nov. 18, 2014.
U.S. Appl. No. 14/680,997, filed Apr. 7, 2015.
U.S. Appl. No. 14/975,336, filed Dec. 18, 2015.
U.S. Appl. No. 15/148,278, filed May 6, 2016.
U.S. Appl. No. 15/282,982, filed Sep. 30, 2016.
U.S. Appl. No. 15/368,406, filed Dec. 2, 2016.
U.S. Appl. No. 15/484,403, filed Apr. 11, 2017.
U.S. Appl. No. 15/783,768, filed Oct. 13, 2017.
U.S. Appl. No. 15/911,020, filed Mar. 2, 2018.
U.S. Appl. No. 15/973,391, filed May 7, 2018.
U.S. Appl. No. 16/379,026, filed Apr. 9, 2019.
U.S. Appl. No. 16/420,675, filed May 23, 2019.
U.S. Appl. No. 16/872,036, filed May 11, 2020.
Dong et al. (2011) "Dynamic Modeling of Li-Ion Batteries Using an Equivalent Electrical Circuit," J. Electrochem. Soc. 158(3):A326-A336.
Extended European Search Report corresponding to European Patent Application No. 14768974.9, dated Oct. 12, 2016.
Gomez et al. (2011) "Equivalent circuit model parameters of a high-power Li-ion battery: Thermal and state of charge effects," Journal of Power Sources. 196(10):4826-4831.
International Search Report with Written Opinion corresponding to International Patent Application No. PCT/US2014/027577, dated Jul. 18, 2014.
International Preliminary Report on Patentability corresponding to International Patent Application No. PCT/US2014/027577, dated Sep. 15, 2015.
International Search Report with Written Opinion corresponding to International Patent Application No. PCT/US2015/066876, dated Apr. 21, 2016.
Keyser et al. (Jan.-Sep. 2010) "Numerical and Experimental Investigation of Internal Short Circuits in a Li-Ion Cell," In; 2011 DOE Hydrogen and Fuel Cells Program, and Vehicle Technologies Program Annual Merit Review and Peer Evaluation.
Kim et al. (Jun. 9-10, 2009) "Lithium-Ion Battery Safety Study Using Multi-Physics Internal Short-Circuit Model," National Renewable Energy Laboratory. In; The 5th Intl. Symposium on Large Lithium-Ion Battery Technology and Applications in Conjunction with ABBC09. Long Beach, California.
Lygte-Info.DK (Snapshot from Jan. 21, 2013) "The Anatomy of a Protected LiIon Battery," Archived Webpage in the Wayback Machine Internet Archive. Accessible on the Internet at URL: http://web.archive.org/web/20130121150403/http://www.lygteinfo.dk/info/battery%20protection%20UK.html. [Last Accessed Jun. 15, 2017].
Maryanka (2002) "Wiring Reduction by Battery Powerline Communication," In; Passenger Car Electrical Architecture (Ref. No. 2000/088) IEE Seminar, 3 pgs.

(56) References Cited

OTHER PUBLICATIONS

Nagasubramanian (2000) "Two- and three-electrode impedance studies on 18650 Li-ion cells," Journal of Power Sources 87:226-229.
Nouvel et al. (2011) "Experiments of In-Vehicle Power Line Communications," Ch. 14 In; Advances in Vehicular Networking Technologies. pp. 255-278.
Ouannes et al. (May 2014) "Cell-wise monitoring of Lithium-ion batteries for automotive traction applications by using power line communication," In; The 18th IEEE International Symposium on Power Line Communications and its Applications (ISPLC), 2014. Mar. 30-Apr. 2, 2014. pp. 24-29.
Roumi (2010) "Shape Changing Transformations: Interactions with Plasticity and Electrochemistry Processes," Ph.D. Thesis. California Technical Institute. pp. 1-136.
Scherer (Mar. 31, 2013) "A Smart Battery Management System for Electric Vehicles using Powerline Communication," Master's Thesis. Insitute for Data Processing. Technische Universitat Munchen. pp. 1-135.
Smith et al. (2006) "Power and thermal characterization of a lithium-ion battery pack for hybrid-electric vehicles," Journal of Power Sources. 160: 662-673.

* cited by examiner

SYSTEMS AND METHODS FOR MANAGEMENT AND MONITORING OF ENERGY STORAGE AND DISTRIBUTION

CROSS-REFERENCE TO RELATED APPLICATIONS

This application is a continuation of U.S. patent application Ser. No. 14/975,336, filed Dec. 18, 2015, which claims the benefit of and priority to U.S. Provisional Application No. 62/094,821, filed on Dec. 19, 2014, and entitled "DISTRIBUTED SMART BATTERY SYSTEM", U.S. Provisional Application No. 62/128,833, filed Mar. 5, 2015 and entitled "DISTRIBUTED BATTERY SENSORS", and U.S. Provisional Application No. 62/147,372, filed Apr. 14, 2015 and entitled "ADVANCED INTEGRATED SENSORS COMMUNICATION SYSTEM". The entirety of each of the above applications, including their respective teachings, is incorporated herein by reference.

BACKGROUND

Electric vehicles and other portable electronic devices typically employ rechargeable batteries to store energy (i.e., charge) when connected to mains electricity and output energy (i.e., discharge) for operation when not connected to mains electricity. Often, multiple batteries (referred to as battery cells) are electrically connected to form a battery pack that provides greater electrical characteristics (e.g., voltage, charge capacity, power density, etc.) than any of the battery cells individually.

Notably, however, the manner in which each battery cell within the battery pack is charged and discharged will impact the electrical properties of the cell as well as the battery pack as a whole. For example, operating a battery cell out of its design tolerances during charging or discharging can result in temporary or permanent loss of charge storage capacity and, if prolonged, can ultimately lead to failure of the cell. In the event that one or more electrical characteristics of a battery cell become reduced compared to other battery cells, this weak cell can raise safety and reliability issues within the battery pack, such as overcharge or under-discharge. Furthermore, when the battery cells are charged or discharged intermittently, rather than continuously over a majority of their service life, it becomes more difficult to keep the cells within tolerance.

Accordingly, there is ongoing interest in improved energy storage and delivery systems that are capable of charging and discharging batteries in a manner that maintains battery charge storage capacity and avoids or mitigates battery failure.

SUMMARY

In an embodiment, a battery monitoring and management system is provided. The system includes a data storage device operative to maintain a plurality of battery pack parameters for at least one battery pack and a computing device in communication with the data storage device. The computing device is operative to: receive at least one battery pack parameter for each battery pack; receive a request to charge or discharge each of the battery packs; determine a plurality of pack operating parameters for each battery pack based upon its received battery pack parameter; and transmit respective pack operating parameters to a battery charging device and the respective battery packs for charging each battery pack according to the pack charging parameters.

Embodiments of the system may further include one or more of the following, alone or in any combination.

In an embodiment of the system, the battery pack parameters include at least one of: a state of health of a battery pack, a state of charge of a battery pack, a voltage profile, a current profile, a temperature profile, a strain tensor profile, an entropy profile, an enthalpy profile, a priority level for a battery pack, a priority level of an electronic device powered by a battery pack, a required change in state of charge, a required energy for completing a desired task in a desired period of time by an electronic device powered by a battery pack, a location of the battery pack, and combinations thereof.

In an embodiment of the system, the performance metric of the system includes at least one of maximizing a change in a state of charge of at least one selected battery pack for a selected time duration, and charging a battery pack powering at least one selected electronic device to a level sufficient to perform a selected task for a selected time duration, a duration of charge of a selected battery pack having a specific state of charge and a specific state of health; average, maximum and minimum temperatures of the battery pack at different locations for a specific state of charge and a specific state of health; change of DC impedance for a specific change of state of charge for a specific state of health, change of AC impedance at a specific frequency for a specific change of state of charge for a specific state of health, total charging or discharging duration, power profile used for charging the battery packs, maximum power used for charging the battery packs, energy profile usage, state of charge of the battery packs vs. time, state of charge of the battery packs vs. power usage, state of charge of battery packs vs. energy usage, and combinations thereof.

In an embodiment of the system, a battery state of health is predicted by measuring the difference between a measured battery parameter and a mean desired battery parameter (based on statistical data points from similar batteries in similar conditions or based on statistical data points expected from the same battery based on the battery's history and computer modeling). In an embodiment a battery is diagnosed as weak when the difference is at least "2" standard deviations of data points.

In an embodiment of the system, the pack operating parameters include at least one of: a pack charging start time, a pack discharging start time, a pack charging duration, a pack discharging duration, a pack state of charge, a pack state of health profile, a pack current profile, a pack voltage profile, a selected voltage range, a selected current range, a pack temperature profile, a pack open circuit voltage after a short rest period during charging, a pack imaginary AC impedance at a specific frequency, a pack real AC impedance at a specific frequency, and combinations thereof.

In an embodiment of the system, the computing device is further operative to determine at least one pack operating parameter based upon statistical data for comparable battery packs. Such as from values of the battery pack parameters of comparable operating devices in comparable conditions. Mathematically a normal distribution of values can be assumed. Examples may include, but are not limited to, duration of charge for a specific change in state of charge for a specific state of health; change of DC impedance for a specific change of state of charge for a specific state of health; change of AC impedance at a specific frequency for a specific change of state of charge for a specific state of health; maximum, average and minimum current for a specific change in state of charge and for a specific state of health; maximum, average and minimum voltage for a specific change in state of charge and for a specific state of health; power required for a specific change in state of charge for a specific state of health; maximum, average and minimum temperature at a specific location of the battery for a specific change in state of charge for a specific state of health; state of charge for a specific charging time and current profile; state of health profile for a specific charging time and current for a specific cycle number, and combinations thereof.

In an embodiment of the system, the computing device is further operative to determine at least one pack charging parameter based upon a charging model. Examples include, but are not limited to, determining the state of charge or state of health based on at least one of the voltage profile, current profile, entropy profile, enthalpy profile, power usage profile, DC impedance profile; AC impedance profile for a specific frequency; and temperature profile of one or more specific locations of the battery, and combinations thereof.

In an embodiment of the system, the request to charge a respective battery pack further includes a user identifier for a user of the battery pack and where the computing device is further operative to determine at least one pack operating parameter based upon the user identifier.

In an embodiment of the system, the computing device is further operative to monitor the battery pack current output as a function of time to detect the presence of malware or a hardware Trojan influencing the operation of an electronic device operating under current received from the battery pack.

In an embodiment of the system, the computing device is further operative to limit current output to the electronic device in response to detecting the presence of malware or a hardware Trojan.

In an embodiment of the system, the computing device is further operative to monitor the battery pack current output as a function of time drawn by a communications device receiving power from the battery pack to determine a proximity of the communications device to a communication network tower.

In an embodiment of the system, the computing device is further operative to monitor the battery pack current output as a function of time drawn by a communications device receiving power from the battery pack to determine the presence of obstacles between the electronic device and a communication network tower and map the location of detected obstacles within an area.

In an embodiment of the system, the computing device is further operative to monitor the battery pack current output as a function of time drawn by an electronic device receiving power from the battery pack to determine a measure of health of the device. Examples of such monitoring may include, but are not limited to, detection of the existence of soft electrical shorts in an electronic device or a group of batteries; detection of wear and tear or unwanted friction of a mechanical device; in which the mentioned health problems of the device result in a change in the power usage of the device.

In an embodiment of the system, the battery charging device is a renewable energy source and the computing device is further operative to: receive weather information; and determine the plurality of pack charging parameters for each battery pack based upon the received weather information.

In an embodiment, the system further includes at least one battery pack. The battery pack includes: a battery pack monitoring and management component operative to: receive the pack operating parameters for the battery pack; and determine a plurality of cell operating parameters for each battery cell based upon the received pack operating parameters, where the plurality of cell operating parameters achieve a performance metric of the battery pack; and at least two energy storage units, each energy storage unit in communication with the battery pack monitoring and management component and including: a battery cell operative to receive energy from the battery charging device and output stored energy as a direct current; and a cell monitoring and management component operative to control at least one electrical parameter of the battery cell alone or in combination with the battery pack monitoring and management component.

As discussed in greater detail below, a cell charging current can be different from the pack charging current; a cell charging duration can be different from a pack charging duration; a cell charging pattern (e.g., current, voltage and time) can be different from a pack charging pattern; provided that a) a state of health or a state of charge of the pack is optimized. for example such that the maximum cycle life of a pack with cells in series connections exceeds the life of at least one of its cells; b) the charging rate of the pack be faster than the charging rate of at least one of its cells. A good cell may be charged faster and more than a weak cell. A weak cell may be discharging into good cells before the charging of the pack starts.

In an embodiment of the system, the cell operating parameters include at least one of: a cell current profile, a cell voltage profile, a cell charge start time, a cell discharge start time, a cell charge duration, a cell discharge duration, a cell temperature profile at a specific location of the cell, a cell DC impedance profile, a cell AC impedance profile at a specific frequency, a cell enthalpy, a cell entropy, a cell open cell voltage for a specific state of charge, a cell state of charge, a cell state of health, and combinations thereof.

In an embodiment of the system, each cell monitoring and management component is operative to measure at least one electrical or physical parameter of its cell.

In an embodiment of the system, the at least one electrical or physical parameter includes at least one of: voltage, current, internal impedance, charging rate, discharging rate, temperature, stress tensor, strain tensor, pressure, acoustic emissions, optical emissions, internal DC resistance, real internal AC impedance for a specific AC frequency, imaginary internal AC impedance for a specific AC frequency, open circuit voltage after a short non-charging period during the charging, and combinations thereof.

In an embodiment of the system, a cell state of health is predicted by measuring the difference between the measured cell parameter and the mean desired cell parameter (based on statistical data points from similar cells in similar conditions or based on statistical data points expected from the same cell based on the cell's history and computer modeling). In an embodiment a cell is diagnosed as weak when the difference is at least "2" standard deviations of data points.

In an embodiment of the system, each cell monitoring and management component is operative to communicate the electrical and physical properties measured for its cell with at least one of: another cell monitoring and management component of the battery pack and the battery pack monitoring and management component.

In an embodiment of the system, the battery pack further includes a plurality of non-volatile memory devices operative to store the electrical and physical properties measured for each cell throughout its service lifetime.

In an embodiment of the system, the battery pack monitoring and management component is further operative to determine the at least one cell operating parameter for each cell based upon a charging model and at least one stored electrical or physical property for the cell. For example, the state of charge and/or state of health may be determined based on at least one of the voltage profile, current profile, open circuit voltage after a short non-charging period during charging, entropy profile, enthalpy profile, power usage profile, DC impedance profile; AC impedance profile for a specific frequency; a temperature profile of one or more specific locations of the battery, and combinations thereof.

In an embodiment of the system, the battery pack monitoring and management component is further operative to determine at least one cell charging parameter based upon statistical data for comparable battery packs or battery cells in comparable operating conditions. Examples may include, but are not limited to, duration of charge for a specific change in state of charge for a specific state of health; change of DC impedance for a specific change of state of charge for a specific state of health; change of AC impedance at a specific frequency for a specific change of state of charge for a specific state of health; maximum, average and minimum current for a specific change in state of charge and for a specific state of health; maximum, average and minimum voltage for a specific change in state of charge and for a specific state of health; power required for a specific change in state of charge for a specific state of health; maximum, average and minimum temperature at a specific location of the battery for a specific change in state of charge for a specific state of health; state of charge for a specific charging time and current profile; a state of health profile for a specific charging time and current for a specific cycle number, and combinations thereof.

In an embodiment of the system, the performance metric of the battery pack includes at least one of a change of state of charge for a selected duration of operation and maintaining a state of health for a selected duration of operating, duration of charge for a specific state of charge and a specific state of health; average, maximum and minimum temperatures of the battery pack at different locations for a specific state of charge and a specific state of health; change of open circuit voltage after a short period of non-charging during charging, change of DC impedance for a specific change of state of charge for a specific state of health; change of AC impedance at a specific frequency for a specific change of state of charge for a specific state of health, and combinations thereof.

In further embodiments of the system, a battery state of health is predicted by measuring the difference between the measured battery parameter and the mean desired battery parameter (based on statistical data points from similar batteries in similar conditions or based on statistical data points expected from the same battery based on the battery's history and computer modeling). In an embodiment a battery is diagnosed as weak when the difference is at least "2" standard deviations of data points.

In an embodiment of the system, each cell monitoring and management component is further operative to cause its cell to be electrically bypassed when a selected electrical or physical parameter of the cell is measured to differ by greater than a threshold amount from an adjacent cell.

In an embodiment of the system, each cell monitoring and management component is further operative to adjust an operating parameter for its battery cell independently of other battery cells of the battery pack according to instructions received from the battery pack monitoring and management component. For example, during charging: if the battery cells are in a parallel arrangement: do nothing; if in a series arrangement: bypass part of the current. In a further example, during discharging: if the battery cells are in a parallel arrangement: convert the voltage to a higher value which reduces the current. If the battery cells are in a series arrangement: do nothing.

In an embodiment of the system, each cell monitoring and management component is further operative to adjust a charging or discharging rate for its battery cell independently of other battery cells of the battery pack.

In an embodiment, a method for charging or discharging a battery pack is provided. The method includes, providing a data storage device operative to maintain a plurality of battery pack parameters for at least one battery pack; and providing a computing device in communication with the data storage device. The computing device is operative to: receive at least one battery pack parameter for each battery; receive a request to charge or discharge each the battery packs; determine a plurality of pack operating parameters for each battery pack based upon its corresponding received battery pack parameter(s), where the plurality of pack charging parameters achieve a performance metric and transmit respective pack operating parameters to a battery charging device and respective battery packs for charging or discharging each battery pack according to its determined the pack operating parameters.

The method further includes one or more of the following, alone or in any combination.

In an embodiment of the method, the battery pack parameters include at least one of: a state of health of the battery pack and a state of charge of the battery pack a voltage profile, a current profile, a temperature profile, a strain tensor profile, an entropy profile, an enthalpy profile, a priority level for a battery pack, a priority level of an electronic device powered by a battery pack, a required change in state of charge, a required energy for completing a desired task in a desired period of time by an electronic device powered by a battery pack, location of the battery pack, and combinations thereof.

In an embodiment of the method, the performance metric includes at least one of maximizing a change in a state of charge of at least one selected battery pack for a selected time duration, and charging a battery pack powering at least one selected electronic device to a level sufficient to perform a selected task for a selected time duration, a duration of charge of a selected battery pack having a specific state of charge and a specific state of health; average, maximum and minimum temperatures of the battery pack at different locations for a specific state of charge and a specific state of health; change of DC impedance for a specific change of state of charge for a specific state of health, change of AC impedance at a specific frequency for a specific change of state of charge for a specific state of health, total charging or discharging duration, power profile used for charging the battery packs, maximum power used for charging the battery packs, energy profile usage, state of charge of the battery packs vs. time, state of charge of the battery packs vs. power usage, state of charge of battery packs vs. energy usage, and combinations thereof.

In an embodiment of the method, the pack operating parameters include at least one of: a pack charging start time, a pack discharging start time, a pack charging duration, a pack discharging duration, a pack state of charge, a pack state of health, a pack current profile, a pack voltage profile, a selected voltage range, a selected current range, a pack temperature profile, a pack open circuit voltage after a short rest period during charging, a pack imaginary AC impedance at a specific frequency, and a pack real AC impedance at a specific frequency, and combinations thereof.

In an embodiment of the method, the computing device is further operative to determine at least one pack operating parameter based upon statistical data for comparable battery packs (e.g., the battery pack parameters of comparable operating devices in comparable conditions). Mathematically a normal distribution of values can be assumed. Examples of such statistical data may include, but are not limited to, duration of charge for a specific change in state of charge for a specific state of health; change of DC impedance for a specific change of state of charge for a specific state of health; change of AC impedance at a specific frequency for a specific change of state of charge for a specific state of health; maximum, average and minimum current for a specific change in state of charge and for a specific state of health; maximum, average and minimum voltage for a specific change in state of charge and for a specific state of health; power required for a specific change in state of charge for a specific state of health; maximum, average and minimum temperature at a specific location of the battery for a specific change in state of charge for a specific state of health; state of charge for a specific charging time and current profile; a state of health profile for a specific charging time and current for a specific cycle number, and combinations thereof.

In an embodiment of the method, the computing device is further operative to determine at least one pack charging parameter based upon a charging model. For example, the state of charge or state of health may be determined based on at least one of the voltage profile, current profile, open circuit voltage after a short non-charging period during charging, entropy profile, enthalpy profile, power usage profile, DC impedance profile; AC impedance profile for a specific frequency; a temperature profile of one or more specific locations of the battery, and combinations thereof.

In an embodiment of the method, the request to charge a respective battery pack further includes a user identifier for a user of the battery pack and where the computing device is further operative to determine at least one pack operating parameter based upon the user identifier.

In an embodiment of the method, the computing device is further operative to monitor the battery pack current output as a function of time to detect the presence of malware or a hardware Trojan influencing the operation of an electronic device operating under current received from the battery pack.

In an embodiment of the method, the computing device is further operative to limit current output to the electronic device in response to detect the presence of malware or a hardware Trojan.

In an embodiment of the method, the computing device is further operative to monitor the battery pack current output as a function of time drawn by a communications device receiving power from the battery pack to determine a proximity of the communications device to a communication network tower.

In an embodiment of the method, the computing device is further operative to monitor the battery pack current output as a function of time drawn by a communications device receiving power from the battery pack to determine the presence of obstacles between the electronic device and a communication network tower and map the location of detected obstacles within an area.

In an embodiment of the method, the computing device is further operative to monitor the battery pack current output as a function of time drawn by an electronic device receiving power from the battery pack to determine a measure of health of the device. Such monitoring may include identification of electricity leaking for an electric device, or excessive wear and tear or friction for a mechanical device.

In an embodiment of the method, the battery charging device is a renewable energy source and the computing device is further operative to: receive weather information; and determine the plurality of pack operating parameters for each battery pack based upon the received weather information.

In an embodiment, the method further includes providing the battery pack. The battery pack includes: a battery pack monitoring and management component operative to: receive the pack operating parameters for the battery pack and; determine a plurality of cell operating parameters for each battery cell based upon the received pack operating parameters; where the plurality of cell charging parameters maximize a performance metric of the battery pack; and at least two energy storage units, each energy storage unit in communication with the battery pack monitoring and management component and including: a battery cell operative to receive energy from the battery charging device and output stored energy as a direct current; and a cell monitoring and management component operative to control at least one parameter of the battery cell alone or in combination with the battery pack monitoring and management component.

A cell charging current can be different from the pack charging current; a cell charging duration can be different from the pack charging duration; a cell charging pattern (current, voltage and time) different from the pack charging pattern; but all such that a) the state of health or state of charge of the pack is optimized, for example such that the maximum cycle life of a pack with cells in series connections exceeds the life of at least one of its cells; b) the charging rate of the pack is faster than the charging rate of at least one of its cells. A good cell may be charged faster and more than a weak cell. A weak cell may be discharging into good cells before the charging of the pack starts.

In an embodiment of the method, the cell operating parameters include at least one of: a cell current profile (current vs. time), a cell voltage profile (voltage vs. time), a cell charging start time, a cell charging duration, a cell temperature profile, a cell open circuit voltage after a short rest period during charging, a cell imaginary AC impedance at a specific frequency, a cell real AC impedance at a specific frequency, a cell state of charge profile (state of charge vs. time), and combinations thereof.

In an embodiment of the method, each cell monitoring and management component is operative to measure at least one electrical or physical parameter of its cell.

In an embodiment of the method, the at least one electrical or physical parameter includes at least one of: voltage, current, charging rate, discharging rate, temperature, stress tensor, strain tensor, pressure, acoustic emissions, optical emissions, internal DC resistance, internal real AC impedance for a specific AC frequency, internal AC imaginary impedance for a specific AC frequency, open circuit voltage after a short non-charging period during the charging, and combinations thereof.

In an embodiment of the system, a cell state of health may be predicted by measuring the difference between the measured cell parameter and the mean desired cell parameter (based on statistical data points from similar cells in similar conditions or based on statistical data points expected from the same cell based on the cell's history and computer modeling). In an embodiment a cell is diagnosed as weak when the difference is at least "2" standard deviations of data points.

In an embodiment of the method, each cell monitoring and management component is further operative to communicate the electrical and physical properties measured for its cell with at least one of: another cell monitoring and management component or the battery pack monitoring and management component.

In an embodiment of the method, the battery pack further includes a plurality of non-volatile memory devices operative to store the electrical and physical properties measured for each cell throughout its service lifetime.

In an embodiment of the method, the battery pack monitoring and management unit is further operative to determine at least one cell operating parameter based upon a model and at least one stored electrical or physical property for the cell. For example, the state of charge or state of health may be determined based on at least one of the voltage profile, current profile, open circuit voltage after a non-charging period during charging, entropy profile, enthalpy profile, power usage profile, DC impedance profile; AC impedance profile for a specific frequency; and temperature profile of one or more specific locations of the battery.

In an embodiment of the method, the battery pack monitoring and management unit is further operative to determine the at least one cell operating parameter for each cell based upon statistical data for comparable battery packs or battery cells. For example, statistical data may include values of the cell parameters of comparable operating devices in comparable conditions. Mathematically a normal distribution of values can be assumed. Examples of cell parameters may include, but are not limited to, a duration of charge for a specific change in state of charge for a specific state of health; change of DC impedance for a specific change of state of charge for a specific state of health; change of AC impedance at a specific frequency for a specific change of state of charge for a specific state of health; maximum, average and minimum current for a specific change in state of charge and for a specific state of health; maximum, average and minimum voltage for a specific change in state of charge and for a specific state of health; power required for a specific change in state of charge for a specific state of health; maximum, average and minimum temperature at a specific location of the battery for a specific change in state of charge for a specific state of health; state of charge for a specific charging time and current profile; a state of health profile for a specific charging time and current for a specific cycle number, and combinations thereof.

In an embodiment of the method, the performance metric of the battery pack includes at least one of: maximizing a change in a state of charge of at least one selected battery pack for a selected time duration, and charging a battery pack powering at least one selected electronic device to a level sufficient to perform a selected task for a selected time duration, a duration of charge of a selected battery pack having a specific state of charge and a specific state of health; average, maximum and minimum temperatures of the battery pack at different locations for a specific state of charge and a specific state of health; change of DC impedance for a specific change of state of charge for a specific state of health, change of AC impedance at a specific frequency for a specific change of state of charge for a specific state of health, total charging or discharging duration, power profile used for charging the battery packs, maximum power used for charging the battery packs, energy profile usage, state of charge of the battery packs vs. time, state of charge of the battery packs vs. power usage, state of charge of battery packs vs. energy usage, and combinations thereof.

In an embodiment of the method, each cell monitoring and management component is further operative to cause its cell to be electrically bypassed when a selected electrical or physical parameter of the cell is measured to differ by greater than a threshold amount from an adjacent cell.

In an embodiment of the method, each cell monitoring and management component is further operative to adjust a charging or discharging rate for its battery cell independently of other battery cells of the battery pack according to instructions received from the battery pack monitoring and management component. For example, during charging: if in a parallel arrangement: do nothing; if in a series arrangement: bypass part of the current. In a further example, during discharging: if in a parallel arrangement: convert the voltage to a higher value which reduces the current. If in a series arrangement: do nothing.

In an embodiment of the method, each cell monitoring and management component is further operative to adjust a charging or discharging rate for its battery cell independently of other battery cells of the battery pack.

In an embodiment, a method for charging a battery pack is provided. The method includes providing a battery pack including at least two energy storage units in electrical communication with one another. Each energy storage unit includes: a battery cell operative to store energy received from an energy source and output stored energy as a direct current; and a cell monitoring and management component in electrical communication with a negative terminal of its battery cell, a positive terminal of its battery cell, and at least one of a negative terminal or a positive terminal of at least one adjacent battery cell. The method further includes, for at least one energy storage unit, receiving, by the cell monitoring and management component, a first charging current profile; transmitting, by the cell monitoring and management component, the first charging current profile to the battery cell; measuring, by the cell monitoring and management component, a cell parameter of the battery cell resulting from receipt of the first charging current profile by the battery cell; and transmitting, by the cell monitoring and management component, an updated second charging current profile to the positive and negative terminal of its battery cell if the measured cell parameter differs from a desired cell parameter by a selected threshold for the battery cell, where the updated second charging current profile is different from the first charging current profile.

In an embodiment, the method further includes one or more of the following, alone or in any combination.

In an embodiment of the method, the first charging current profile includes at least one of: a constant, a step function, a linear decrease, a linear increase and combinations thereof. For example, For example the input current profile may charge at C rate for 70% of time and then rate C/2 for the remaining time.

In an embodiment of the method, the second charging current profile includes at least one of: a constant, a step function, a linear decrease, a linear increase and combinations thereof. For example the output current profile may charge at C/2 rate for 85% of time and then C/4 for the remaining time.

In an embodiment of the method, the measured cell parameter is at least one of voltage, current, charging rate, discharging rate, temperature, stress tensor, strain tensor, pressure, acoustic emissions, optical emissions, internal DC resistance, internal real AC impedance for a specific AC frequency, internal AC imaginary impedance for a specific AC frequency, open circuit voltage after a short non-charging period during the charging, and combinations thereof.

In an embodiment of the method, the selected threshold includes at least one of: about 2 or more standard deviations difference from a mean of statistical data points for comparable battery cells under comparable conditions, about 5% or more difference from an expected value, about 10% or more difference from an expected value, about 20% or more difference from an expected value, and about 50% or more difference from an expected value.

In an embodiment of the method, a desired cell parameter is a cell state of charge, where a difference between an actual cell state of charge estimated based on the measured cell parameters and the desired cell state of charge is about 5% or at least 10%, and the second charging current profile is selected such that an energy input to the cell for a selected future time period by the second charging current profile is reduced as compared to an energy input to the cell for the selected future time by the first charging current profile.

In further embodiments, the difference between the measured cell parameter and the desired cell parameter is at least 10%, or at least 50% or is at least 2 standard deviations when the desired cell parameter is the mean of the distribution from a set of statistical data points; and second charging current profile includes one or more of: reducing the first current profile such that the difference between the measured cell parameter, due to the adjustment in the current profile, and the desired cell parameter reduces to 10% or less or 5% or less.

In an embodiment of the method, the difference between the measured cell parameter and the mean desired cell parameter, based on statistical data points from similar cells in similar conditions or based on statistical data points expected from the same cell based on the cell's history and computer modeling, is at least "2" standard deviations of data points; and second charging current profile includes one or more of: reducing the first current profile such that the difference between the measured cell parameter, due to the adjustment in the current profile, and the desired cell parameter reduces to "one" standard deviation of data points or less.

In an embodiment of the method, the second charging profile reduces the difference between the measured cell parameter and the desired value of the cell parameter to less than the selected threshold.

In an embodiment of the method, the second charging current profile includes at least one of decreasing the charging current and decreasing the duration of active charging of the cell during the charging period of the battery pack.

In an embodiment of the method, during charging, the voltage output of the cell monitoring and management component is lower than the voltage output of its battery cell.

In an embodiment of the method, the battery pack further includes a battery pack monitoring and management component in electrical communication with each energy storage unit and the method further includes receiving, by the cell monitoring and management component of each energy storage unit, the desired cell parameter for its battery cell from the battery pack monitoring and management component.

In an embodiment, the method further includes transmitting, by the cell monitoring and management component, the at least one measured cell parameter for its cell to the battery pack monitoring and management component.

In an embodiment, the method further includes determining, by the battery pack monitoring and management component, at least one of a state of health and a state of charge for a selected battery cell in response to receipt of its measured cell parameter.

In an embodiment, the method further includes: transmitting, by the battery pack monitoring and management component, the desired cell parameter for the selected battery cell to its cell monitoring and management component; determining, by the battery pack monitoring and management component, an updated desired cell parameter for the selected battery cell based upon its determined state of health or state of charge; and transmitting, by the battery pack monitoring and management component, the updated desired cell parameter for the selected battery cell to the cell monitoring and management component.

In a further embodiment, a method for discharging a battery pack is provided. The method includes providing a battery pack including at least two energy storage units in electrical communication with one another. Each energy storage unit includes: a battery cell operative to store energy received from an energy source and output stored energy as a direct current; and a cell monitoring and management component in electrical communication with a negative terminal of its battery cell, a positive terminal of its battery cell, and at least one of a positive terminal and a negative terminal of an adjacent battery cell; and a battery pack monitoring and management component in electrical communication with each battery cell. The method also includes transmitting, by the battery pack monitoring and management component, a desired cell discharging current profile and at least one desired cell parameter for a selected battery cell to its cell monitoring and management component; outputting, by the selected battery cell, a first discharging current profile in response to receipt of the desired cell discharging profile and the desired cell parameter by its cell monitoring and management component; measuring, by the cell monitoring and management component of the selected battery cell, at least one cell parameter of the selected battery cell in response to output of the first discharging current profile, where at least one measured cell parameter corresponds to the desired cell parameter; and adjusting, by the cell monitoring and management component of the selected battery cell, the current profile output of the selected battery cell from the first discharging current output to a second discharging current output, different from the first discharging current output, if at least one measured cell parameter corresponding the desired cell parameter differs from the desired cell parameter by a selected threshold for the selected battery cell, where the second discharging current profile is different from the first discharging current profile.

Measuring, by the cell monitoring and management component, a cell parameter of its battery cell in response to output of the first discharging current profile, the measured cell parameter corresponding to the desired cell parameter; and adjusting, by the cell monitoring and management component, the output of its battery cell from the first discharging current output to a second discharging current output, different from the first discharging current output, if the measured cell parameter differs from the desired cell parameter by a selected threshold for its battery cell, where the second discharging current profile is different from the first discharging current profile.

In an embodiment, the method further includes one or more of the following, alone or in any combination.

In an embodiment of the method, the first discharging current profile includes one or more of a constant, a step function, a linear decrease, a linear increase, and combinations thereof.

In an embodiment of the method, the second discharging current profile includes one or more of: a constant, a step function, a linear decrease, a linear increase, and combinations thereof. As discussed in greater detail below, the second discharging profile is selected such that the difference between selected measured cell parameters and selected desired cell parameters reduces to below of the threshold levels. Examples of the parameters are voltage or temperature of the cell or its open cell voltage after a non-discharging period during the discharge session In an embodiment of the method, the measured cell parameter is at least one of voltage, current, internal impedance, state of charge, charging rate temperature, pressure, acoustic emissions, optical emissions temperature, stress, strain, internal DC resistance, real internal AC impedance for a specific AC frequency, imaginary AC impedance for a specific AC frequency, open circuit voltage after a short non-charging period during the charging, and combinations thereof.

In an embodiment of the method, the selected threshold includes at least one of about 2 or more standard deviations difference from the mean of statistical data points, about 5% or more difference from an expected value, about 10% or more difference from an expected value, about 20% or more difference from an expected value, and about 50% or more difference from an expected value.

In an embodiment of the method, the difference between the measured cell parameter and the desired cell parameter is the desired cell parameter is a cell state of charge, where a difference between the an actual cell state of charge estimated based on the measured cell parameters and the desired cell state of charge is about 5% and second discharging current profile is selected such that the energy output from the battery cell is reduced for a selected future time period by the second charging current profile as compared to the energy output from the battery cell for the selected future time period by the first discharging current profile In an embodiment of the method, the second discharging current profile reduces the difference between the actual state of charge and the desired state of charge to less than the selected threshold.

In an embodiment of the method, the second charging current profile includes at least one of decreasing the discharging current, and decreasing a duration of active discharging of the cell during a discharging period of the battery pack.

In an embodiment of the method, during discharging, the voltage output of the cell monitoring and management component is higher than the voltage output of the cell itself.

In an embodiment, the method further includes providing a battery pack monitoring and management component in electrical communication with each energy storage unit and the method further includes receiving, by the cell monitoring and management component of each energy storage unit, the desired cell parameter for its battery cell from the battery pack monitoring and management component.

In an embodiment, the method further includes transmitting, by the cell monitoring and management component of the selected cell, the at least one measured cell parameter for its cell to the battery pack monitoring and management component.

In an embodiment, the method further includes determining, by the battery pack monitoring and management component, at least one of a state of health, a state of charge, for a selected battery cell in response to receipt of its measured cell parameter.

In an embodiment, the method further includes determining, by the battery pack monitoring and management component, an updated desired cell parameter for the selected battery cell based upon its determined state of health or state of charge; and transmitting, by the battery pack monitoring and management component, the updated desired cell parameter for the selected battery cell to its cell monitoring and management component.

In an embodiment, a method for discharging a battery is provided. The method includes providing a battery pack. The battery pack includes at least two energy storage units in electrical communication with one another and a battery pack monitoring and management component. Each energy storage unit includes a battery cell operative to store energy received from an energy source and output stored energy as a direct current; and a cell monitoring and management component in electrical communication with a negative terminal of its battery cell, a positive terminal of its battery cell, and at least one of a negative terminal or a positive terminal of at least one adjacent battery cell. The battery pack monitoring and management component is in electrical communication with each of the energy storage units. The method further includes transmitting, by the battery pack monitoring and management component, a desired cell discharging current profile and at least one desired cell parameter for a selected battery cell to its cell monitoring and management component; outputting, by the selected battery cell, a first discharging current profile in response to receipt of the desired cell discharging profile and the desired cell parameter by its cell monitoring and management component; measuring, by cell monitoring and management component of the selected battery cell, at least one cell parameter of the selected battery cell resulting from output of the first discharging current profile by the selected battery cell; estimating, by at least one of the cell monitoring and management component or the battery pack monitoring and management component, a state of charge and state of health of the selected battery cell, based on the values of at least one cell parameter profile; communicating, by the cell monitoring and management component, at least one cell parameter measurement of its battery cell, an estimated state of charge of the selected battery cell, and an estimated state of health of the selected battery cell to at least one other cell monitoring and management component corresponding to a battery cell in electrical communication with the selected battery cell or to the battery pack monitoring and management component; estimating, by at least one of the cell monitoring and management component or the battery pack monitoring and management component, at least one desired cell parameter value for the selected battery cell, based on information determined from the selected battery cell itself, at least one battery cell in electrical communication with the selected battery cell and the battery pack monitoring and management component; determining, by at least one of the cell monitoring and management component or the battery pack monitoring and management component, a second discharging current profile for the selected battery cell, based on the estimated cell state of charge of the selected battery cell, the estimated state of health of the selected battery cell, and the first discharging profile; and transmitting, by the cell monitoring and management component of the selected battery cell, the second discharging current profile from between the positive and negative terminals of the selected battery cell, if at least one of the measured cell parameters for the selected battery cell differs from a desired cell parameter for the selected battery cell by a selected threshold for the selected battery cell, where the second discharging current profile is different from the first discharging current profile.

In an embodiment of the method, the first discharging current profile includes at least one or more of: a constant, a step function, a linear decrease, a linear increase, and combinations thereof.

In an embodiment of the method, the second discharging current profile includes at least one or more of: a constant, a step function, a linear decrease, a linear increase, and combinations thereof.

In an embodiment of the method, the measured cell parameter is at least one of voltage, current, internal impedance, state of charge, charging rate temperature, pressure, acoustic emissions, optical emissions temperature, stress, strain, internal DC resistance, real internal AC impedance for a specific AC frequency, imaginary AC impedance for a specific AC frequency, open circuit voltage after a short non-charging period during the charging, and combinations thereof.

In an embodiment of the method, the selected threshold includes at least one of: about 2 or more standard deviations difference from the mean of statistical data points, about 5% or more difference from an expected value, about 10% or more difference from an expected value, about 20% or more difference from an expected value, and about 50% or more difference from an expected value, "2" or more standard deviations difference from the mean of statistical data points, 5% or more, 10% or more, 20% or more, 50% or more, difference from the expected value.

In an embodiment of the method, the difference between the estimated cell state of charge based on the measured cell parameters and the desired cell state of charge is about 5% and the second discharging current profile includes one or more of: reducing the discharging current output of the cell by the cell monitoring and management component to a lower level such that the output voltage of the cell converts to a higher value at any time such that the power output stays the same and decreasing the duration of active discharging of the cell during the discharging period of the pack.

In an embodiment of the method, the second charging profile reduces the difference between the newly measured cell parameter and a desired value of the cell parameter to less than the selected threshold.

In an embodiment, the battery pack further includes a battery pack monitoring and management component in electrical communication with each energy storage unit and where the method further includes receiving, by the cell monitoring and management component of each energy storage unit, the desired cell parameter for its battery cell from the battery pack monitoring and management component.

In an embodiment, the method further includes transmitting, by the cell monitoring and management component, the measured cell parameter for its cell to the battery pack monitoring and management component.

In an embodiment, the method further includes determining, by the battery pack monitoring and management component, at least one of a state of health, a state of charge, for a selected battery cell in response to receipt of its measured cell parameter.

In an embodiment, the method further includes transmitting, by the battery pack monitoring and management component, the desired cell parameter for the selected battery cell to its cell monitoring and management component; determining, by the battery pack monitoring and management component, an updated desired cell parameter for the selected battery cell based upon its determined state of health or state of charge; and transmitting, by the battery pack monitoring and management component, the updated desired cell parameter for the selected battery cell to the cell monitoring and management component.

In an embodiment, monitoring and management system for batteries is provided. The system includes at least one battery charging device; at least one data storage device operative to maintain a plurality of battery pack parameters for at least one battery pack of at least one operating device and to maintain a plurality of charging device parameters for each charging device; and at least one computing device in communication with each data storage device, each battery pack and each charging devise. The at least one computing device is operative to receive at least one battery pack parameter for each battery pack; receive at least one charging device parameter for each charging device; receive a request to charge each of the battery packs by at least one charging device; determine a plurality of pack operating parameters for each battery pack based upon received battery pack parameters from each of the battery packs and charging device operating parameters for each of the charging devices, where the plurality of pack charging parameters achieves a performance metric of the system; and transmit respective pack operating parameters for a selected battery pack to at least one selected battery charging device and to the selected battery pack for charging the selected battery pack according to the pack operating parameters by the selected battery charging devices.

In an embodiment of the system, the charging device parameters include at least one of: location, profile of the current output available for charging for a period of time in future, maximum current output, desired output current.

In an embodiment, a method for charging a battery pack is provided. The method includes providing a data storage device operative to maintain a plurality of battery pack parameters for at least one battery pack powering operation of least one electronic device, and to maintain a plurality of charging device parameters for at least one charging device; and providing a computing device in communication with the data storage device, the battery pack and the charging device. The computing device is operative to: receive at least one battery pack parameter for each battery; receive at least one charging device parameter for each charging device; receive a request to charge each the battery packs by the plurality of charging devices; determine a plurality of pack charging parameters for each battery pack based upon received battery pack parameters and the received charging device parameters, where the plurality of pack charging parameters achieve a performance metric of the group of electronic devices and charging devices; and transmit respective pack charging parameters for a selected battery pack to at least one selected battery charging device and the selected battery pack for charging the selected battery pack by the selected charging device according to the pack charging parameters.

In an embodiment of the method, the charging device parameters include at least one of: location, profile of the current output available for charging for a period of time in future, maximum current output, desired output current.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1A:
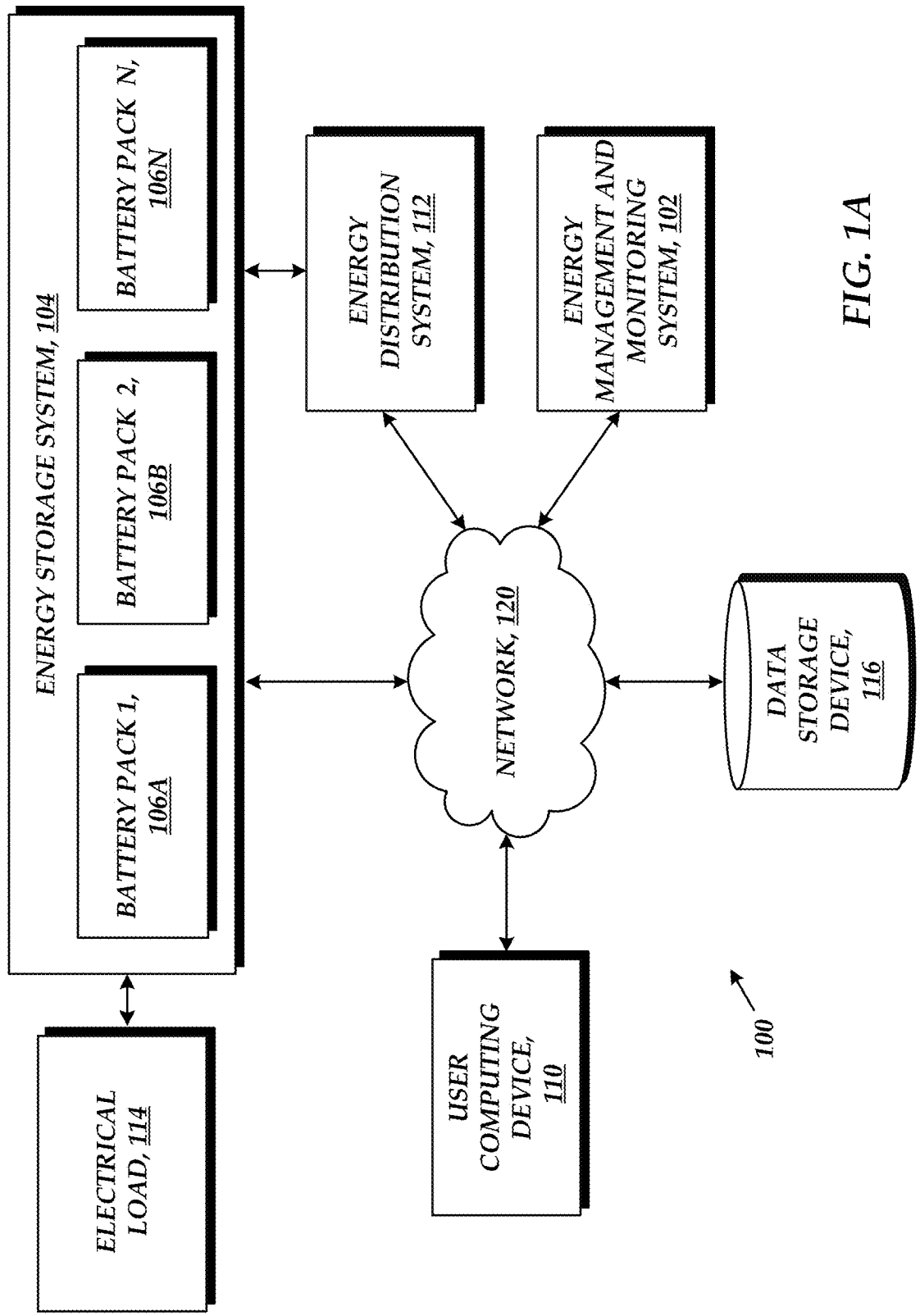
FIGS. 1A-1B are block diagrams illustrative of an embodiment of a computing environment for monitoring and control of energy storage and distribution to a plurality of battery packs.

In general, the terms and phrases used herein have their art-recognized meaning, which can be found by reference to standard texts, journal references and contexts known to those skilled in the art. The following definitions are provided to clarify their specific use in the context of the disclosed embodiments.

"Battery cell" or "cell" is an electrochemical device capable of generating electrical energy from chemical reactions or facilitating chemical reactions through introduction of electrical energy.

"Battery" is a device including two or more battery cells.

"Battery pack" is a set of any number of batteries or individual battery cells. Battery packs may be configured in a series, parallel, or mixtures thereof to deliver a desired voltage, capacity, or power density.

"State of health" is a measure of a battery's capacity capability to deliver its specified output.

"State of charge" is a measure of an available amount of charge stored by a battery as compared with a reference amount of charge.

"Profile" refers to a value of a parameter as a function of time, including an instantaneous or current value.

Embodiments of the present disclosure are directed to systems and methods for monitoring and managing charging and discharging of batteries. A plurality of battery packs is provided in communication with an energy monitoring and control system. Each battery pack includes a plurality of battery cells that operate collectively to dictate the capabilities of the battery pack. The battery packs may also be provided in electrical communication with an energy distribution system for charging the battery packs or an electrical load for discharging the battery packs.

As discussed in greater detail below, the energy monitoring and control system determines a plurality of pack charging or pack discharging parameters for each battery pack that, when performed, achieve one or more performance metrics at a user level (e.g., performance metrics of each battery pack within a system of multiple battery packs). The battery pack further determines a plurality of cell charging or cell discharging parameters for each battery cell based upon the determined plurality of pack charging or pack discharging parameters for each battery cell that, when performed, achieve one or more performance metrics at a battery level (e.g., performance metrics of different cells of each battery pack).

For example, electrical and physical parameters of each battery cell are measured and recorded during operation by the cell and further communicated to the energy monitoring and control system and other battery cells within the battery pack. From one or more of these measurements, state estimations (e.g., state of health, state of charge, etc.) are determined for each cell and battery pack. The energy monitoring and control system further performs simulations according to a charging or discharging model using these state measurements under different operating conditions to respectively determine charging or discharging parameters for each battery pack that achieve the desired user level performance metrics. The battery pack may employ programmed logic based using the determined pack charging and discharging parameters to further determine charging and/or discharging parameters for each battery cell that, when performed, achieve the desired battery level performance metrics.

For example, assume an operating environment where the energy monitoring and control system is employed with an electrical vehicle charging station that charges multiple electric vehicles. Further assume that the energy monitoring and control system operates to minimize a user level performance metric, a total amount of time that elapses between arriving at the charging station and completion of the charging process. Accordingly, the energy monitoring and control system estimates a waiting time for each user extending from their time of arrival until vehicle charging begins and a charging time extending between the start and end of charging.

The energy monitoring and control system determines the waiting time based upon a priority assigned to each user and the number of users waiting for charging. In an embodiment, the vehicles of higher priority users are charged prior to vehicles operated by lower priority users. As a result, when higher and lower priority users are each waiting to start charging, the system minimizes waiting times for higher priority users over lower priority users. Highest priority users may include, but are not limited to, public safety and emergency users (e.g., law enforcement, fire, search and rescue, other first responders, etc.) while lower priority users may include consumer users. Next highest priority users may include, but are not limited to, public transportation vehicles. Lowest priority users may include, but are not limited to, consumer users.

The energy monitoring and control system further determines the charging time for each battery pack based upon simulations. The simulations for each battery pack take into account operating conditions affecting battery pack performance, such as the respective state (e.g., state of health, state of charge) of the battery pack. Further operating conditions may optionally include one or more of weather conditions, local traffic conditions, the type of vehicle powered by the battery pack, statistical performance of the battery pack over many users, user driving history, etc. Thus, any operating parameters to be accounted for in the simulations are provided to the energy monitoring and control system (e.g., by communication with the battery pack, user input, or other data sources).

As needed, the waiting time may be varied in the context of the charging time to optimize (i.e., minimize) the total time spent by users in aggregate at the charging station. Continuing the example above, assume two users of equal priority are waiting to charge their respective vehicles, where the charging time of a first user is expected to be significantly greater than the second user. In this circumstance, the energy monitoring and control system may adjust the waiting time for each user such that the total time of the two users together is minimized.

With further reference to the example above, performance metrics of battery cells and battery packs may also be optimized. Assume that the energy monitoring and control system operates such that each battery cell receives enough charge to perform a desired task such as reaching a desired destination at a desired time. Optimizing this performance metric may require that cells having relatively higher charge storage capacity as compared to other cells within their battery pack ("healthy cells") are charged faster or earlier.

In either case, the energy monitoring and control system further determines charging parameters for each battery cell based upon simulations. The simulations for each battery cell take into account operating conditions affecting battery pack performance during charging, such as a respective state (e.g., state of health, state of charge) of each battery cell prior to charging, a respective state of each battery cell required after charging to perform a desired task (e.g., reaching the desired destination) and a charging current profile (current vs. time) available to be received by each cell. Further operating conditions may optionally include one or more of weather conditions, local traffic conditions, the type of vehicle powered by the battery pack, statistical performance of the battery pack over many users, user driving history, etc. Thus, any operating parameters to be accounted for in the simulations are provided to the energy monitoring and control system (e.g., by communication with the battery pack, user input, or other data sources).

Figure 1B:
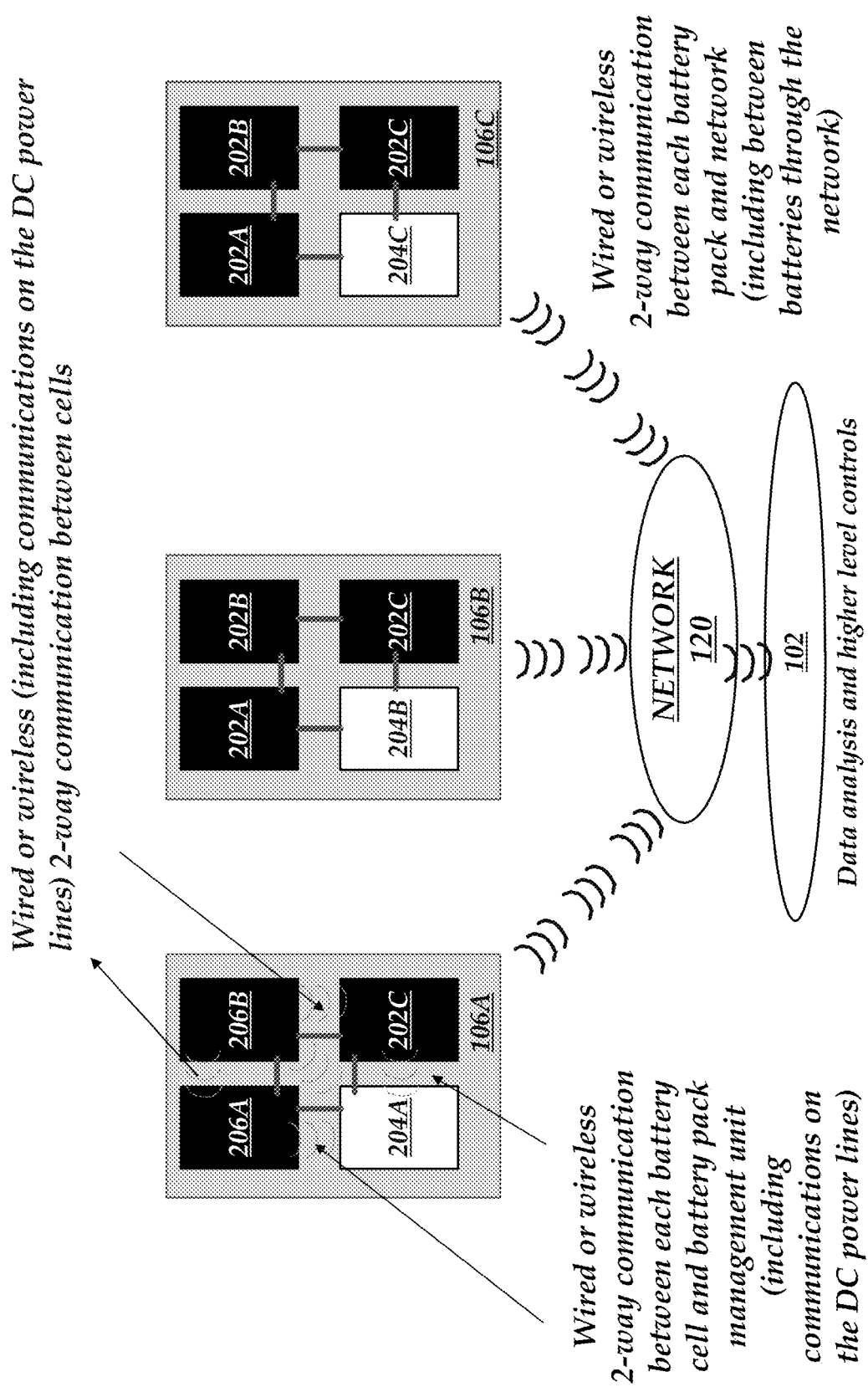

The discussion will now turn to FIGS. 1A-1B, which illustrates embodiments of a computing environment 100 for monitoring and controlling energy storage and distribution. The computing environment 100 includes an energy management and monitoring system 102, an energy storage system 104 including a plurality of battery packs 106 (e.g., 106A, 106B, . . . 106N), a user computing device 110, an energy distribution system 112, an electrical load 114, and a data storage device 116, each in communication via a network 120. It may be understood that, while the energy storage system 104 is described herein in the context of a plurality of battery packs 106, embodiments of the disclosure may be directed to any energy storage device without limit. For example, in alternative embodiments, the energy storage system may include capacitive energy storage devices such as supercapacitors, alone or in combination with one or more battery packs.

Embodiments of the energy management and monitoring system 102 and the user computing device 110 may be independently selected any computing device such as desktop computers, laptop computers, mobile phones, tablet computers, set top boxes, entertainment consoles, server computers, client computers, and the like.

To provide for interaction with a user, the energy management and monitoring system 102 and the user computing device 110 may each employ any form of sensory feedback (e.g., visual feedback, auditory feedback, or tactile feedback) to communicate with a user. Input from the user can, for example, be received in any form, including acoustic, speech, and/or tactile input. For example, the energy management and monitoring system 102 and the user computing device 110 may each independently include one or more electronic display devices alone or in combination with one or more user input devices. Examples of electronic displays may include, but are not limited to, cathode ray tube displays (CRTs), a liquid crystal displays (LCD), light emitting diode displays (LEDs), touch-sensitive displays, and the like. Examples of user input devices include, but are not limited to, keyboards, pointing devices such as a mouse or a trackball, voice recognition, gesture recognition, etc. Accordingly, interactions between a user and either of the energy management and monitoring system 102 and the user computing device 110 with a user can include display of information to the user via one or more electronic displays and receipt of input from the user via one or more of the user input devices.

Embodiments of the energy distribution system 112 may include any source of energy capable of providing electrical energy to the energy storage system 104. Examples of the energy distribution system 112 may include, but are not limited to, mains electricity, batteries, and renewable energy sources (e.g., solar, wind, water, geothermal, etc.).

The electrical load 114 is any electronic device capable of receiving electrical energy from the energy storage system 104. Examples of the electrical load 114 may include, but are not limited to, portable electronic devices (e.g., computers, mobile phones, tablet computers, etc.), electric or hybrid gas-electric vehicles, lighting devices, home appliances (e.g., washers, dryers, refrigerators, etc.), heating, ventilation, air conditioning, and the like.

Embodiments of the data storage device 116 may include one or more data storage device capable of maintaining computer-readable data. Examples may include, but are not limited to, magnetic storage (e.g., tape, hard disk drives, etc.), solid state storage (e.g., flash memory, etc.) and other computer-readable media known in the art.

Embodiments of the network 120 may include, but are not limited to, packet or circuit-based networks. Examples of packet based networks may include, but are not limited to, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Examples of circuit-based networks may include, but are not limited to, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Data transmission and instructions can also occur over the network 120. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Figure 2:
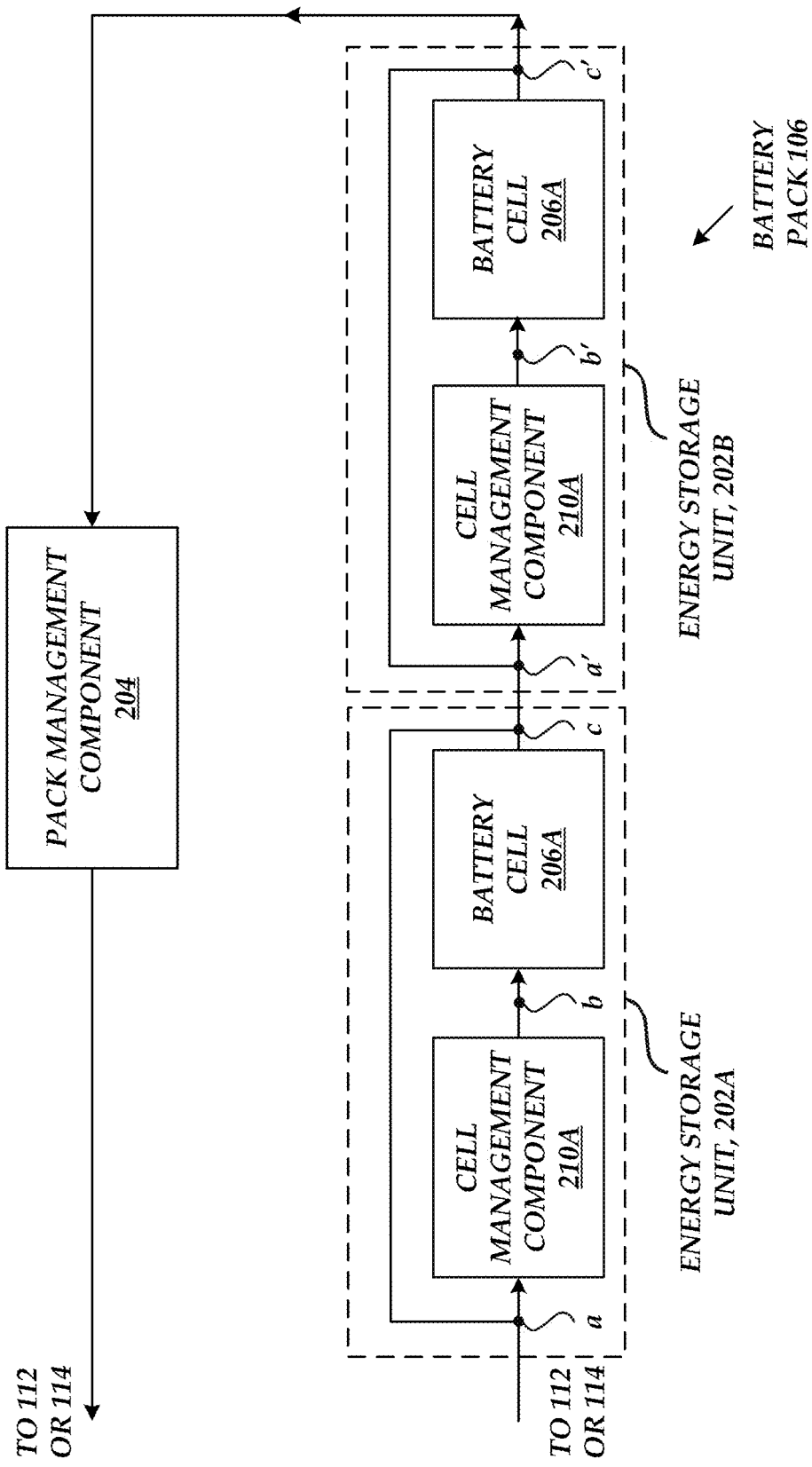
FIG. 2 is a schematic illustration of an embodiment of a rechargeable battery pack of the present disclosure.

With further reference to FIG. 2, an embodiment of a battery pack 106 is illustrated in greater detail. The battery pack 106 includes a plurality of energy storage units 202 (e.g., 202A, 202B, . . . ) and a battery pack monitoring and management component 204, where each of the energy storage units 202 are in electrical communication with one another or capable of electrical communication with one another. Each energy storage unit 202 further includes a battery cell 206 (e.g., 206A, 206B) and a corresponding cell monitoring and management component 210 (e.g., 210A, 210B, . . . ). While the battery pack 106 is illustrated in FIG. 2 as a single device, it may be understood that functionalities describe herein for of one or more of the battery pack monitoring and management component 204, the battery cells 206, and the cell monitoring and management component 210 may be distributed between a plurality of devices without limit.

Each cell monitoring and management component 210 is in electrical communication with a negative terminal of its battery cell 206, a positive terminal of its battery cell 206, and a negative terminal of an adjacent battery cell 206. For example, considering the energy storage unit 202B, the cell monitoring and management component 210B is in electrical communication with negative terminal b' of battery cell 206B, positive terminal c' of battery cell 206B, and negative terminal a' of battery cell 206A.

The energy management and monitoring system 102 operates to monitor, predict, and manage the battery packs 106 in order to maximize a performance metric of the energy storage system 104. For example, each battery pack 106 may be assigned a network address (e.g., an IP address) allowing the energy management and monitoring system 102 to communicate with each battery pack 106 via the network 120. Such communication may occur over wires or wirelessly.

Figure 3A:
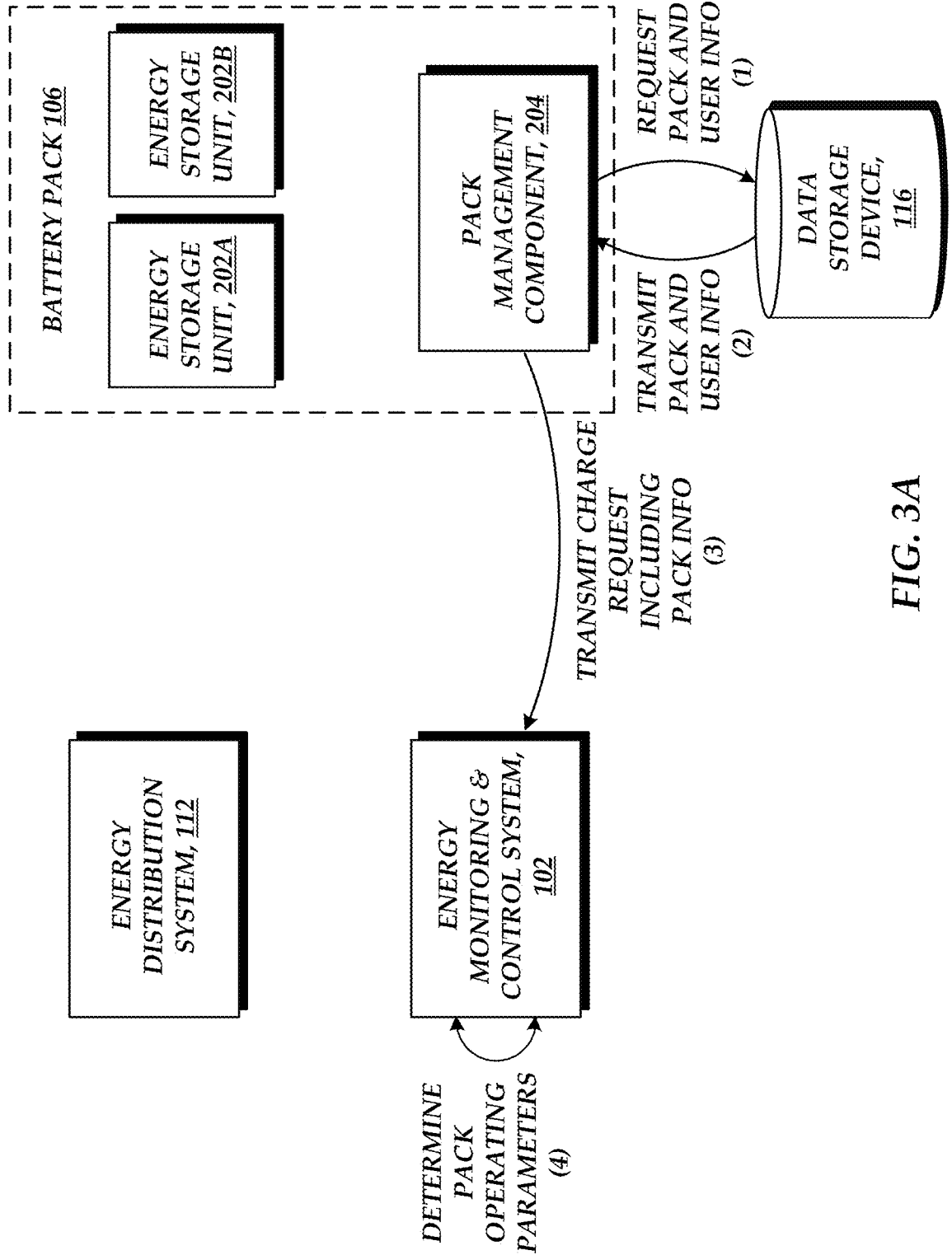
FIGS. 3A-3C are schematic flow diagrams illustrating monitoring and control of charging of a battery pack according to an embodiment of the disclosure.
Figure 3B:
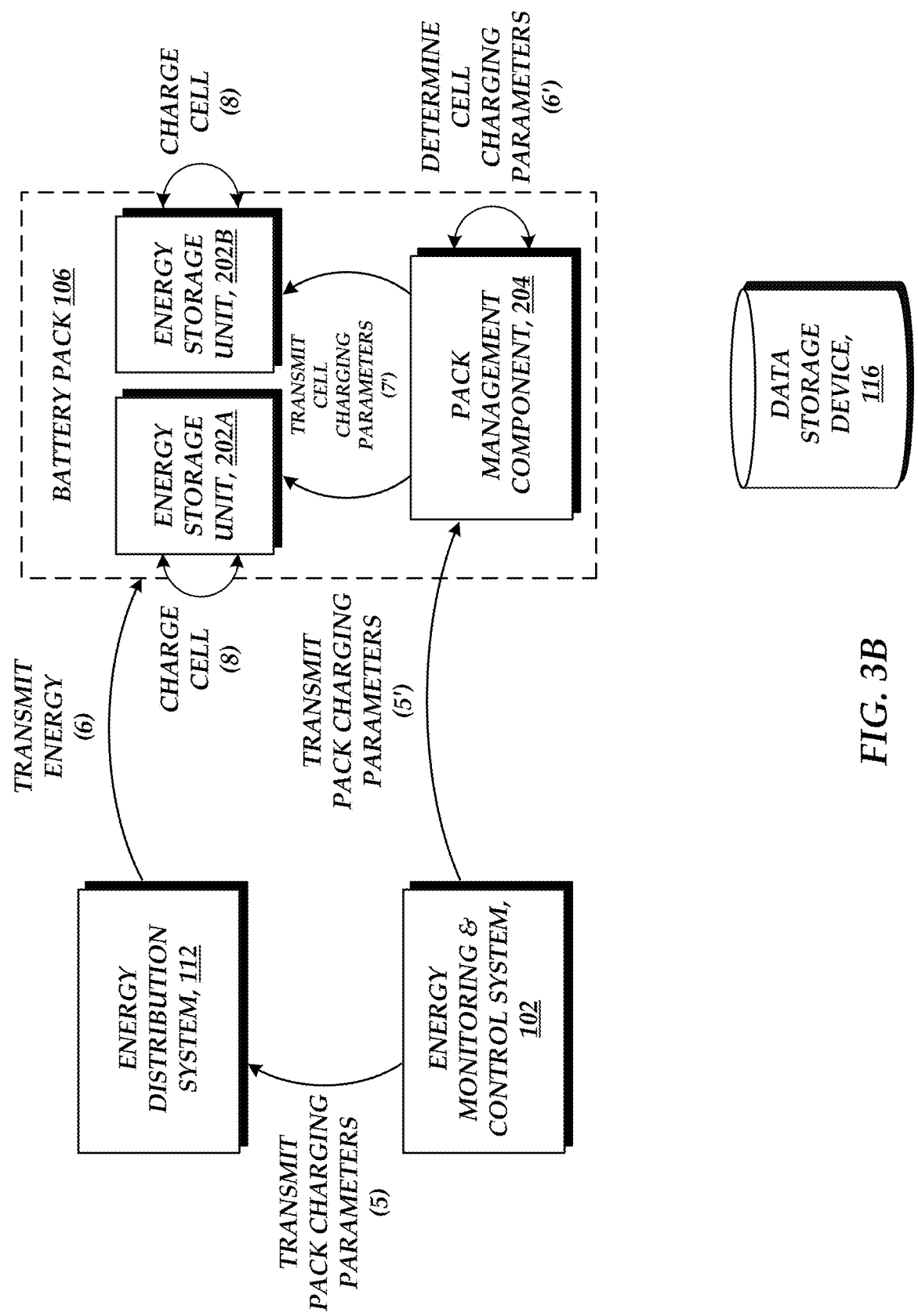
Figure 3C:
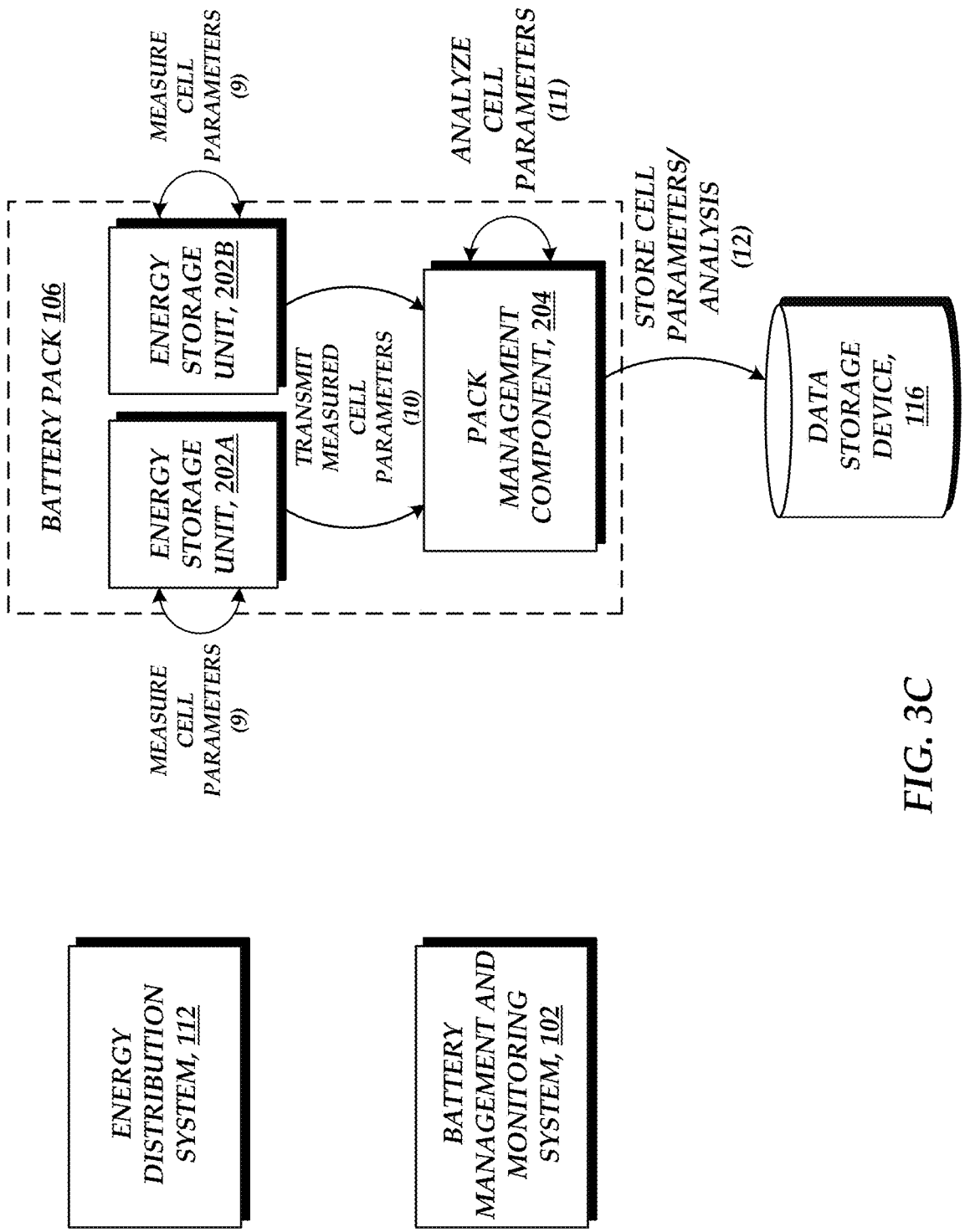

The discussion will now turn to FIGS. 3A-3C, which present flow diagrams illustrating operation of the energy management and monitoring system 102 to monitor and control of charging of a battery pack 106 according to an embodiment of the disclosure. The monitoring and control operations begin with receipt of a request to charge a battery pack. For example, a user, employing his or her user computing device 110, may request that the battery pack 106 be charged. The request includes battery pack information and information regarding the user of the battery pack. In one embodiment, the battery pack information and user information may be retrieved from the data storage device 116 and transmitted to the energy management and monitoring system 102 with the request.

The battery pack information may include one or more battery pack parameters. For example, each cell monitoring and management component 210 may measure one or more electrical and physical parameters of its corresponding battery cell 206 during operation. To accomplish these measurements, each cell monitoring and management component 210 may include a plurality of sensors (not shown) in communication with the battery cell 206 (e.g. within the battery cell 206, outside the battery cell 206, and combinations thereof). During operation of the battery pack 106, these sensors measure the electrical and physical parameters of the cell. Examples of the cell electrical parameters may include, but are not limited to, voltage, current, internal impedance, state of charge, charging rate, temperature, internal DC resistance, real internal AC impedance for a specific AC frequency, imaginary AC impedance for a specific AC frequency, open circuit voltage after a short non-charging period during the charging, and combinations thereof. Examples of the cell physical parameters may include, but are not limited to, temperature, stress tensor, strain tensor, pressure, acoustic emissions, optical emissions, and combinations thereof.

The cell monitoring and management component 210 may further communicate these measured cell properties to the battery pack monitoring and management component 204, other cell monitoring and management components 210, and combinations thereof. Such communication is performed over wires, wirelessly, and combinations thereof. Wired communications may include, but are not limited to, communication on a DC power line extending between the battery pack monitoring and management component 204 and each energy storage unit 202. In further embodiments, these measured cell parameters may be stored in the data storage device 116.

The measured cell parameters may also be analyzed (e.g., by the cell monitoring and management component 210 corresponding to the battery cell 206, another cell monitoring and management component corresponding to a different battery cell, the battery pack monitoring and management component 204, the energy management and monitoring system 102, and combinations thereof) to determine corresponding battery pack parameters. These battery pack parameters may be stored in the data storage device 116 and subsequently retrieved for inclusion in the request. Examples of the pack electrical parameters may include, but are not limited to, a voltage profile, a current profile, a temperature profile, a strain tensor profile, an entropy profile, an enthalpy profile, a priority level for a battery pack, a priority level of an electronic device powered by a battery pack, a required change in state of charge, a required energy for completing a desired task in a desired period of time by an electronic device powered by a battery pack, a location of the battery pack, and combinations thereof. Examples of the pack physical parameters may include, but are not limited to, temperature, pressure, acoustic emissions, optical emissions, stress tensor, strain tensor, and combinations thereof, such as a function of one or more of the mentioned parameters (e.g., a state of health of a battery pack, a state of charge of a battery pack, as discussed in greater detail below).

The user information may be any information regarding a user of the battery pack 106 to be charged that is pertinent to control of the charging process. The user information may be stored by the user in the data storage device for later retrieval and inclusion in the request. Alternatively, not shown, the user may provide the user information directly when making the request. For example, as discussed above, the identity of the user may be employed by the energy management and monitoring system 102 to prioritize charging of a battery pack 106 associated with a high priority user over other battery packs 106 associated with lower priority users. In further examples discussed below, the energy storage system 104 may be different devices belonging to a single user and the user provides the energy management and monitoring system 102 with priorities for charging or discharging each battery pack 106.

The measured the electrical and physical parameters of the battery pack 106 (e.g., a profile for one or more pack parameter values over a selected operating time-frame) are transmitted to the energy management and monitoring system 102 (e.g., by respective cell monitoring and management components 210 or the battery pack monitoring and management component 104) for use in determining charging or discharging parameters for the battery pack 106. For example, the pack parameters are employed by the energy management and monitoring system 102 to estimate a state of charge (SOC) and a state of health (SOH) for the battery pack 106. For example, state of health and state of charge before and after charging or discharging may be estimated from numerical models based upon operating conditions. Optionally, comparable cell parameters measured for other cells in similar operational conditions (e.g., environment, working conditions, etc.) may also be employed in this modeling. That is to say, it is possible to predict the state of charge and state of health of cells and/or batteries in advance, based upon known operating conditions. As discussed herein, operating parameters may refer to current and previous electrical and/or physical parameters of one or more battery packs 106. For example, methods to estimate the statement of health and statement of charge of a battery pack from numerical models based upon operating conditions may include, but are not limited to, empirical methods based on coulomb counting, voltage profile, entropy profile, enthalpy profile, open circuit voltage after a rest period during charging or discharging or a combination thereof:

With these predictions, the most effective charging and discharging parameters (also referred to herein as operational parameters) are determined for each battery cell and battery pack 106 in order to achieve performance goals of one or more of the battery cells, battery packs 106, and the energy storage system 104. Examples of operational parameters at the level of the battery pack 106 may include, but are not limited to, a pack charging start time, a pack discharging start time, a pack charging duration, a pack discharging duration, a pack state of charge, a pack state of health profile, a pack current profile, a pack voltage profile, a selected voltage range, a selected current range, a pack temperature profile, a pack open circuit voltage after a short rest period during charging, a pack imaginary AC impedance at a specific frequency, a pack real AC impedance at a specific frequency, and combinations thereof. Examples of charging parameters at the level of the battery cell may include, but are not limited to, a cell current profile, a cell voltage profile, a cell charging start time, a cell discharging start time, a cell charging duration, a cell discharging duration, a cell state of charge profile, a cell state of health profile, a cell temperature profile at a specific location of the cell, a cell DC impedance profile, a cell AC impedance profile at a specific frequency, a cell enthalpy, a cell entropy, a cell open circuit voltage for a specific state of charge, and combinations thereof. For example, as discussed in greater detail below, it is possible to selectively charge the battery cells 206 of the battery pack 106 such that healthy cells are discharged more than weak cells. It is also possible to charge the healthy battery cells and corresponding healthy battery packs 106 faster (e.g., higher current) than weak battery cells and corresponding weak battery packs 106.

Examples of performance goals at the level of the battery cells may include, but are not limited to, maximizing a change in a state of charge of at least one selected battery pack for a selected time duration, and charging a battery pack powering at least one selected electronic device to a level sufficient to perform a selected task for a selected time duration, a duration of charge of a selected battery pack having a specific state of charge and a specific state of health; average, maximum and minimum temperatures of the battery pack at different locations for a specific state of charge and a specific state of health; change of DC impedance for a specific change of state of charge for a specific state of health, change of AC impedance at a specific frequency for a specific change of state of charge for a specific state of health, total charging or discharging duration, power profile used for charging the battery packs, maximum power used for charging the battery packs, energy profile usage, state of charge of the battery packs vs. time, state of charge of the battery packs vs. power usage, state of charge of battery packs vs. energy usage, and combinations thereof.

The energy management and monitoring system 102 transmits the pack charging parameters to both the energy distribution system 112 (e.g., a charging station) and the battery pack 106 (e.g., battery pack monitoring and management component 204). The energy distribution system 112 transmits energy to the battery pack in accordance with the received battery pack charging parameters. As discussed in further detail below, based on the received pack charging parameters, the battery pack monitoring and management component 204 further determines respective cell charging parameters for each battery cell 206 that maximize the performance metrics of the battery cells 206 the battery pack 106 as a whole. Thus, the battery pack monitoring and management component 204 decides which battery cells 206 will be charged and at what rates. In one example, for a given time, current, and energy, it may be advantageous to charge or discharge individual battery cells 206 differently, such as fully cycling healthy cells (e.g., from 10% SOC to 95% SOC) and less cycling of weak cells (e.g., from 30% SOC to 75% SOC).

During the charging process, one or more cell parameters of each battery cell may be measured (e.g., by respective cell monitoring and management components 210, transmitted to the battery pack monitoring and management component 204, and subsequently stored for future retrieval using the data storage device 116. Further analysis, such as current state of health and current state of charge for the cell and/or battery pack as well as predictions of future states of health and states of charge may be further performed and stored (e.g., by the battery pack monitoring and management component 204).

Figure 4A:
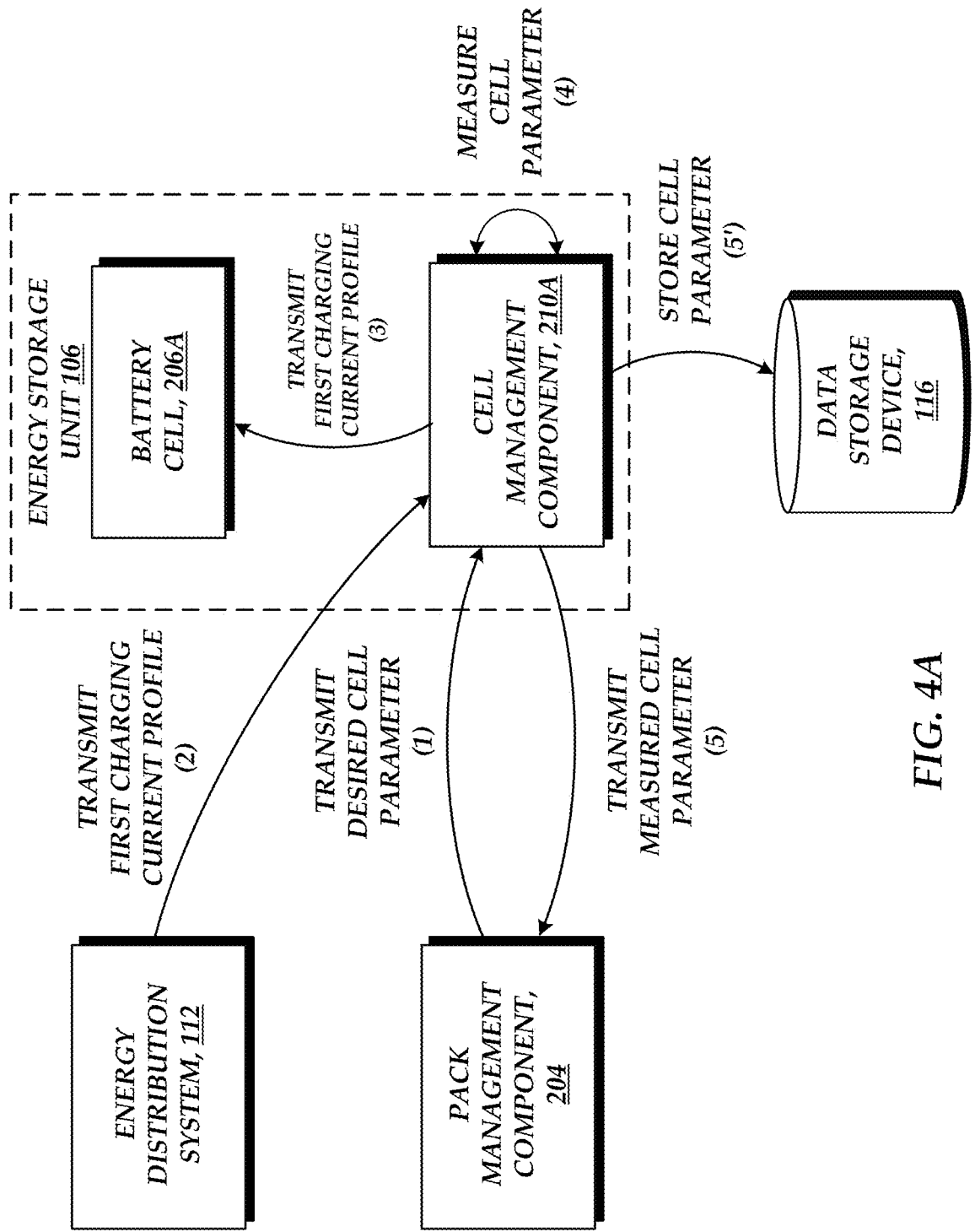
FIGS. 4A-4C are schematic flow diagrams illustrating monitoring and control of battery cell charging according to an embodiment of the disclosure.
Figure 4B:
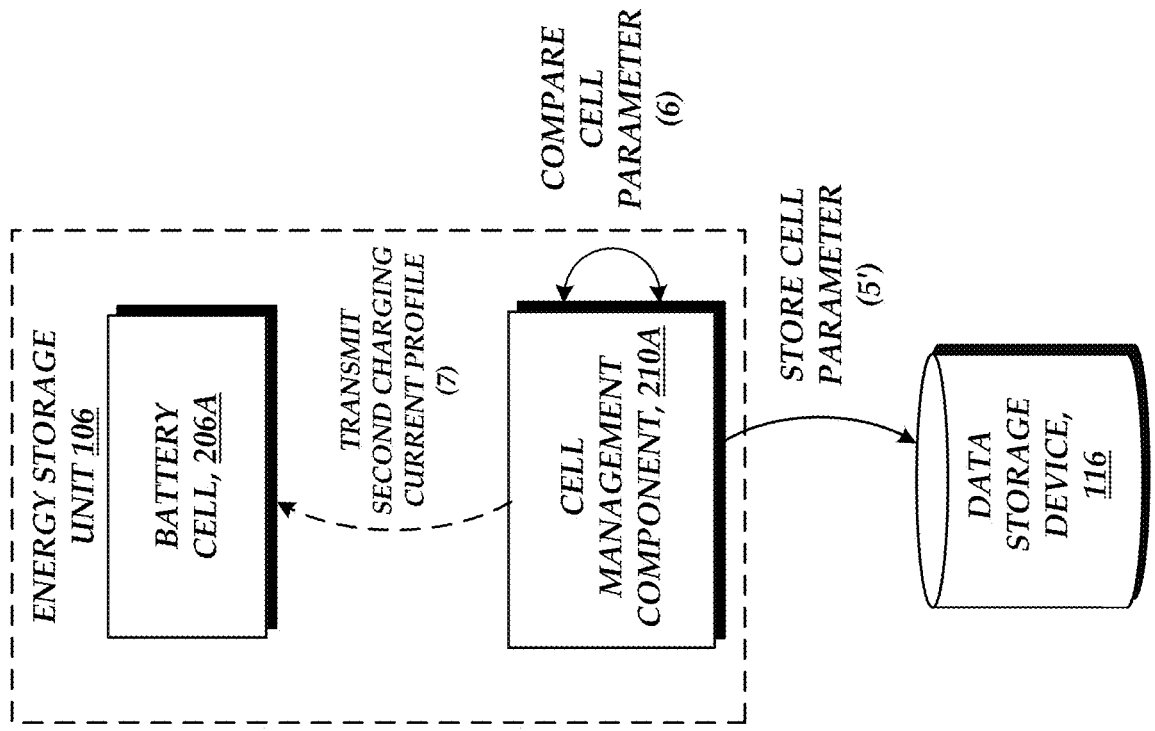
Figure 4B:
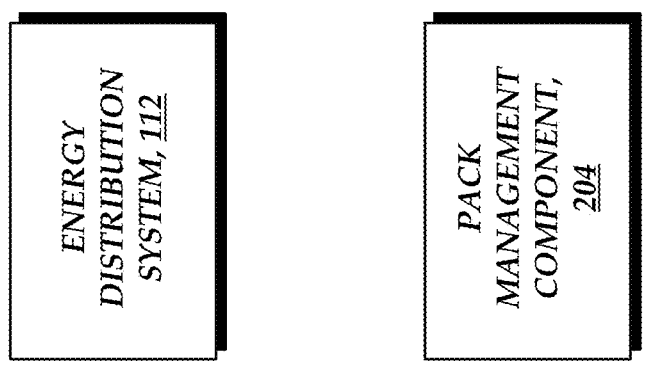
Figure 4C:
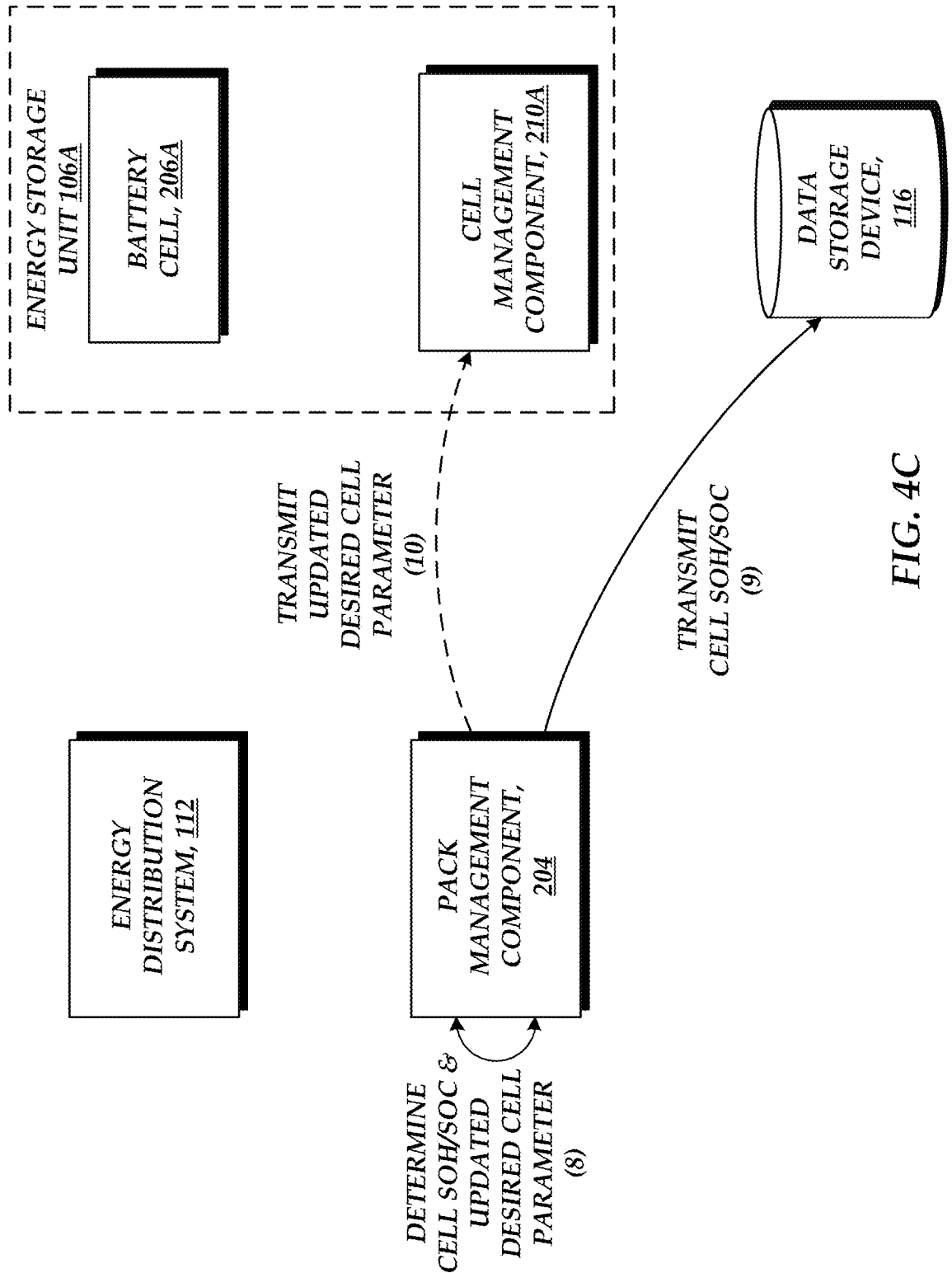

The discussion will now turn to FIGS. 4A-4C which illustrate monitoring and control of a battery cell during charging according to embodiments of the disclosure. The cell monitoring and management component 210 may regulate current or voltage received by its respective battery cell 206 to achieve desired cell parameters (e.g., one or more of the cell charging or discharging parameters determined by the battery pack monitoring and management component 204).

For example, assume that battery cell 206A is to be charged. The cell monitoring and management component 210A receives a desired cell parameter from the battery pack monitoring and management component 204 and a first charging current profile (i.e., a current as a function of time) from the energy distribution system 112. In response to receipt of the first charging current profile, the cell monitoring and management component 210A transmits the first charging current profile to the positive terminal b of battery cell 206A (FIG. 2). The cell monitoring and management component 210A also measures at least one cell parameter of the battery cell 206A resulting from receipt of the first charging current profile by the battery cell 206A. The measured cell parameter(s) may be stored using the data storage device 116 where it is maintained for later retrieval.

The cell monitoring and management component 210A further compares the measured cell parameter to the desired cell parameter. In certain embodiments, the desired cell parameter may be received from the battery pack monitoring and management component 204 and include one or more of the charging parameters determined by the battery pack monitoring and management component 204. If the measured cell parameter for the battery cell 206A differs from a desired cell parameter by a threshold value, the cell monitoring and management component 210A transmits a second charging current profile to the positive terminal b of battery cell 206A, where the updated second charging current profile is different from the first charging current profile.

After receiving the measured cell parameter, the battery pack monitoring and management component 204 further uses this measurement to calculate at least one of the state of charge and/or state of health of the battery cell 206A during charging. Should the SOH or SOC after charging differ significantly in the charging process, the battery pack monitoring and management component 204 may further determine an updated desired cell parameter for the battery cell 206A to reflect a change in one or more of the charging parameters. This updated desired cell parameter is transmitted to the cell monitoring and management component 210A for further use in the charging process, as discussed above. The measured SOH and SOC may be stored using the data storage device 116 where it is maintained for later retrieval.

For example, the first charging current profile may be a constant current at C rate. The second charging current profile may be a constant current at 2 C rate for about 50% of time, C/4 for about 5% of time, C/2 rate for about 30% of time, C rate for about 10% of time, and C/4 for about 5% of time. The threshold may be two standard deviations from a mean expected value of any of temperature, open circuit voltage after a short rest during the charging, entropy and enthalpy, and the like.

Figure 5A:
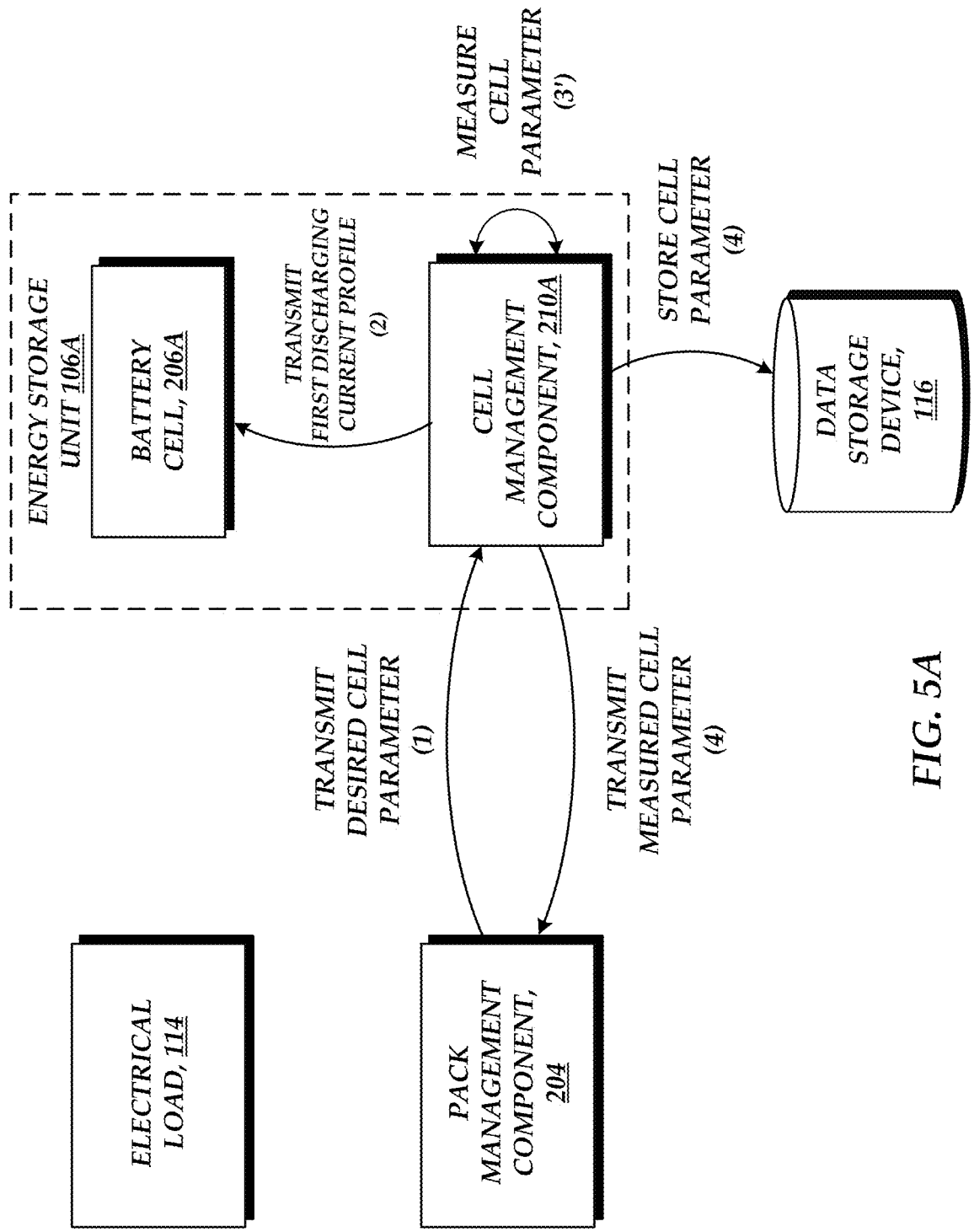
FIGS. 5A-5C are schematic flow diagrams illustrating monitoring and control of battery cell discharging according to an embodiment of the disclosure.
Figure 5B:
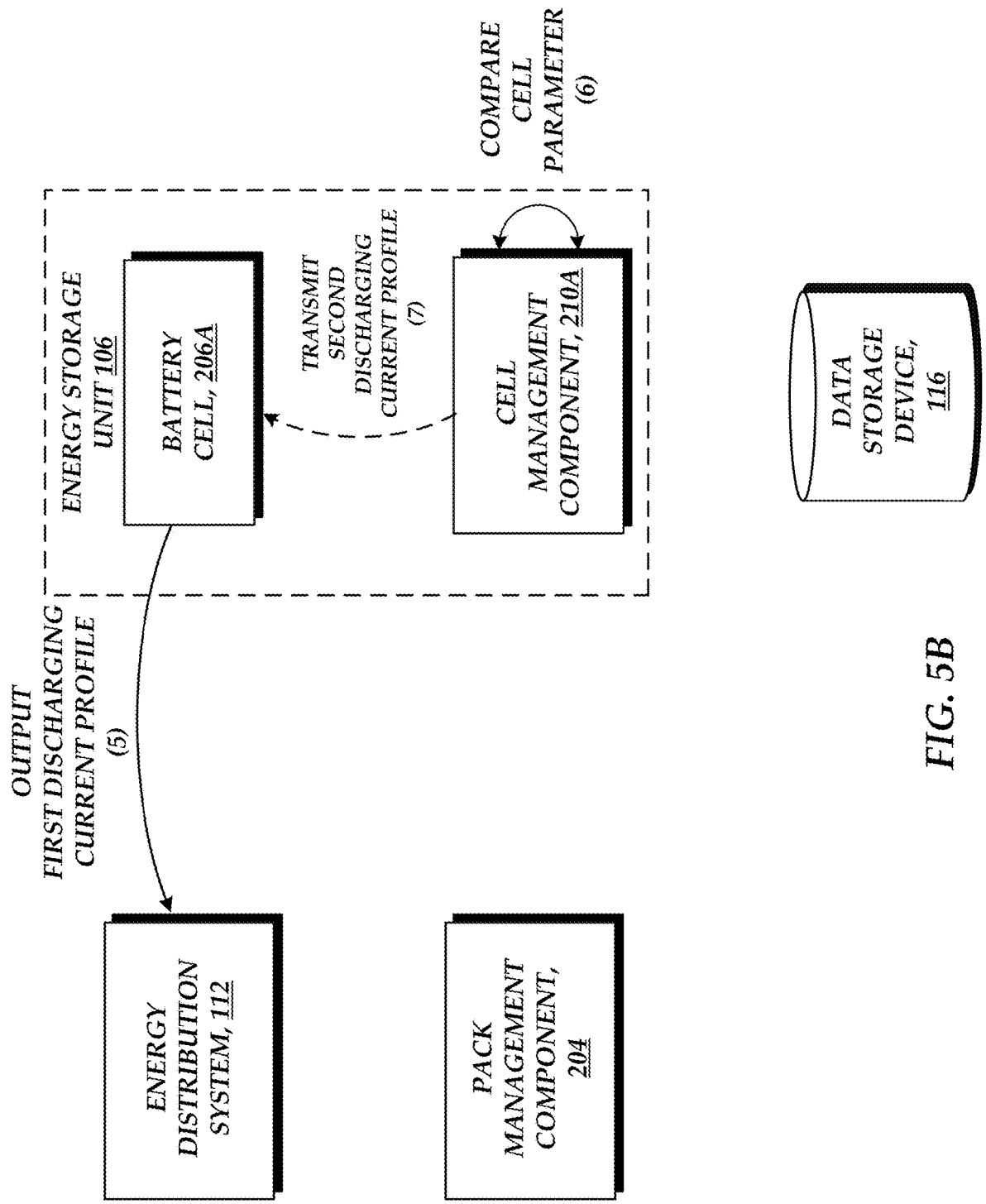
Figure 5C:
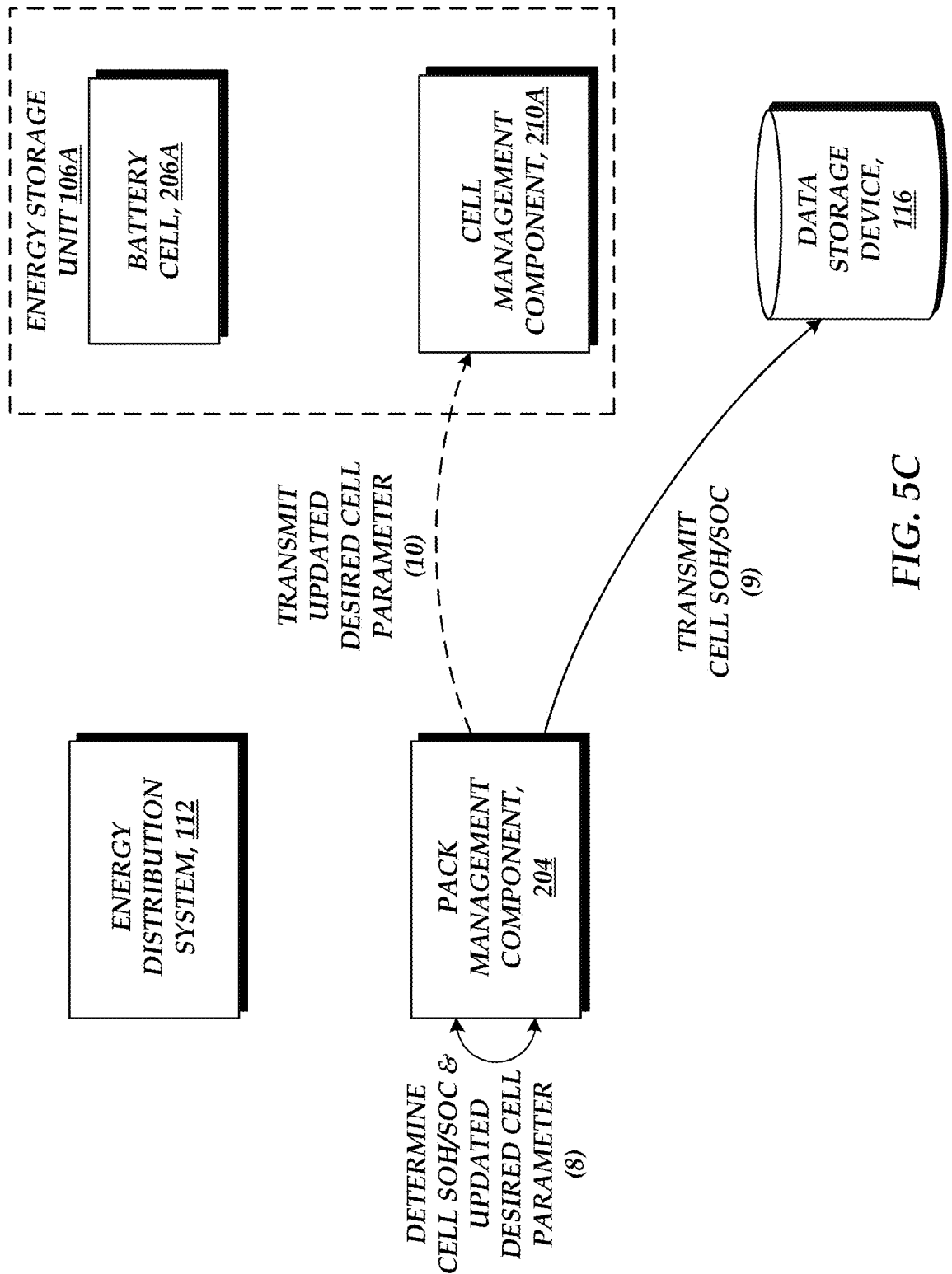

The discussion will now turn to FIGS. 5A-5C which illustrate monitoring and control of a battery cell during discharging according to embodiments of the disclosure. As above, assume that battery cell 206A is to be discharged. The battery pack monitoring and management component 204 transmits a desired cell parameter for the battery cell 206A to the cell monitoring and management component 210A, represent one or more of the discharging parameters determined by the battery pack monitoring and management component 204. In response to receipt of the desired cell parameter, the cell monitoring and management component may transmit instructions to the battery cell 206A resulting in output of a first discharging current profile by the battery cell 206A. The cell monitoring and management component 210A also measures at least one cell parameter of the battery cell 206A resulting from output of the first discharging current profile by the battery cell 206A. The measured cell parameters include at least one cell parameter corresponding to the desired cell parameter and may be stored using the data storage device 116 where it is maintained for later retrieval. In further embodiments, the cell monitoring and management component 210A transmits the measured cell parameter to the battery pack monitoring and management component 204A.

The cell monitoring and management component 210A further compares the measured cell parameter to the desired cell parameter. If the measured cell parameter for the battery cell 206A differs from the desired cell parameter by a threshold value, the cell monitoring and management component 210A transmits further instructions to the battery cell 206A to adjust the output discharging current profile from the first discharging current profile to a second discharging profile, where the second discharging profile is different from the first discharging current profile.

The first discharging current profile may be a constant current at C rate. The second discharging current profile may be a constant current at 2 C rate for about 50% of time, C/4 for about 5% of time, C/2 rate for about 30% of time, C rate for about 10% of time, and C/4 for about 5% of time. The threshold may be two standard deviation from the mean expected value of any of temperature, open circuit voltage after a short rest during the discharging, entropy and enthalpy.

After receiving the measured cell parameter, the battery pack monitoring and management component 204 uses this measurement to calculate at least one of the state of charge or state of health of the battery cell 206A. The battery pack monitoring and management component 204 may further determine an updated desired cell parameter for the battery cell 206A and transmit the updated desired cell parameter to the cell monitoring and management component 210A for further use in the discharging process, as discussed above. The SOH and SOC may be stored using the data storage device 116 where it is maintained for later retrieval.

EXAMPLES

Further examples of monitoring and managing operations for battery cells 206 will now be discussed on the battery/cell level and the user level.

Example 1

Optimizing Energy Performance

Embodiments of the energy management and monitoring system 102 may further optimize the charging process for battery packs 106 disclosed herein when the energy distribution system 112 is intermittent. For example, this circumstance may arise for an energy distribution system 112 that is not connected to an electrical grid (e.g., renewable energy sources such as solar, wind, hydroelectric, tidal, geothermal, etc.). Alternatively, this circumstance may arise for charging stations that are connected to an electrical grid during brownout conditions, where an intentional or unintentional drop in voltage is experienced by the electrical grid.

Assume that that the energy storage system 104 is in communication with an energy distribution system 112 that is photovoltaic (i.e., solar powered). As a result, the energy distribution system 112 only has access to a finite amount of charge capacity in a given time. Under these circumstances, the energy management and monitoring system 102 may be configured to receive information regarding current weather (e.g., from a weather station) and weather forecasts (meteorological analysis) to predict the amount of power that will be available for charging at a given time. The energy management and monitoring system 102 may also be configured to receive additional user input regarding expected power demands. For example, in the context of a house having utilities, appliances, and the like, the user may provide estimated times during which the user anticipates being at home, the timing and duration of selected activities that will be performed (e.g., laundry, cooking, etc.), settings of energy consuming devices (e.g., temperature set points for hot water heaters, heating/cooling systems, etc.). From this input, the energy management and monitoring system 102 may quantify expected energy use. This can prepare the energy storage system 104 for optimized discharging when required to cover any power shortfalls that arise and optimized charging when not in use.

In further embodiments, when the event the energy management and monitoring system 102 predicts that there will be insufficient power to meet all user demands, the energy management and monitoring system 102 may further prompt the user to reschedule their activities, suggest alternative schedules, and/or prioritize each anticipated power demand in order to minimize or eliminate any anticipated power shortfall.

At the user level, knowing that more power is coming may allow the energy management and monitoring system 102 to charge weak batteries packs 106 from healthy battery packs 106 earlier than the charging from the charging station begins, so that not only the healthy battery packs 106 are recharged but the weak battery packs 106 as well. In this manner, the healthy battery packs 106 make enough room for the anticipated power input. Furthermore, if the energy management and monitoring system 102 predicts more power consumption, the healthy battery packs 106 may start discharging the weak battery packs earlier into themselves to be prepared for rapid release of power to the user, as the discharging rate from the healthy battery packs, further filled more by the weak battery packs, can be faster than discharging the healthy and weak battery packs at the same time.

At the battery/cell level, knowing that more power is coming may allow battery packs 106 to charge weak battery cells 206 from healthy battery cells 206 earlier than the charging from the charging of the whole pack begins, so that not only the healthy battery cells 206 are recharged but the weak battery cells 206 as well. In this manner, the healthy battery cells 206 make enough room for the anticipated power input. Furthermore, if the energy management and monitoring system 102 predicts more power consumption, the healthy battery cells 206 may start discharging the weak battery cells 206 earlier into themselves to be prepared for rapid release of power to the user.

Example 2

Location Detection

Embodiments of the energy management and monitoring system 102 and the energy storage system 104 may be further employed for location determination. For example, the amount of power consumed by data communication devices such as cellular phones or wi-fi devices to send and receive data varies depending upon their proximity to signal transmitters (e.g., cellular network towers, wi-fi base stations and repeaters, etc.). There are often more than one signal transmitter in an area. Accordingly, the energy management and monitoring system 102 may monitor and analyze the power discharged from the energy storage system 104 to send and receive signals in order to predict the proximity of the device to the transmitters. This can be employed as an addition or alternative to global positioning systems (GPS).

In further embodiments, signals lose strength when passing through obstacles (e.g., walls). Thus, when one or more obstacles are present between the transmitter and the data communication device, more power is consumed when the device transmits a signal. Thus, it is possible to map an area, such as the inside of a building, by monitoring this energy use for a long enough period of time. For example, a long enough period of time may be such that the device can be physically present at all the areas for more than once. This may be accomplished by comparing the measured power usage profile with the expected power usage profile when there is no obstacle, based on the same device or similar devices in similar operating conditions. A threshold of acceptable difference can be defined by the user, in the format of percentage of difference from the expected value or in the format of multiples of standard deviations difference from the mean expected value. Any differences in power usage from the expected value that is larger than the threshold value can indicate the presence of an obstacle between the electricity powered transceiver device and the antennas in its vicinity. A mathematical model based on locations of the device and the antennas, weather, battery state of health, battery state of charge, battery temperature and any other device-task related arbitrary parameters can be used.

Example 3

Estimate Device Health

Embodiments of the energy management and monitoring system 102 and the energy storage system 104 may be further employed to estimate the health of a data communication device. For example, the amount of energy used for data transmission can further depend upon the age of the device. Accordingly, this energy consumption may be used to determine the health of the device.

In another embodiment, electrically powered devices, such as data storage devices, processors, logic controllers or cellular devices, may attempt to send data to another party without authorization of the user when malfunctioning. As data transmission requires power, in this circumstance, monitoring the power consumption of the device can reveal the malfunction. This may be accomplished by comparing a measured power usage profile with an expected power usage profile, based on the same device or similar devices in similar operating conditions. A threshold of acceptable difference can be established (e.g., by the user, by a manufacturer, etc.) in the format of percentage of difference from the expected value or in the format of multiples of standard deviations difference from the mean expected value. Any differences in power usage from the expected value that is larger than the threshold value can indicate the malfunctioning of the electricity powered device. A mathematical model based on location, weather, battery state of health, battery state of charge, battery temperature and any other device-task related arbitrary parameters can be used.

In a further embodiment, the energy management and monitoring system 102 and the energy storage system 104 may be further employed to predict the cell and battery pack parameters over time. For example, assume an electric vehicle powered by the energy storage system 104 in communication with the energy management and monitoring system 102. The energy management and monitoring system 102 may receive at least one battery pack parameter for the electric vehicle (e.g., a historical driving pattern of the vehicle, one or more electrical or physical parameter of the battery packs 106 or battery cells 206), as well as statistical data regarding other comparable battery packs (e.g., battery employed by other electric vehicles in similar circumstances such as similar location, traffic, and/or weather). The statistical data may include one or more of driving patterns of other vehicles, one or more electrical parameters of the comparable battery packs, one or more physical parameters of the comparable battery packs, one or more electrical or physical parameters of the comparable battery packs, etc.). From this received information, the energy management and monitoring system 102 may predict at least one of the state of health and state of charge of each of the battery packs 106 and/or battery cells 206 of the vehicle. From this prediction, it is further possible to discharge good cells more than weak cells in the pack or charge the good cells faster (e.g., higher current) than the weak cells, as needed.

Example 4

Malware Detection

Embodiments of the energy management and monitoring system 102 and the energy storage system 104 may be further employed to detect malware. A computing device may be affected by a malicious computer worm or virus. For example, the computing device may be a programmable logic controller, which allows automation of electro-mechanical processes such as those used to control machinery. It is extremely difficult to identify such malware.

However, by precise monitoring of the energy supplied to the computing device over time by the energy storage system 104 (e.g., at about 1% of normal power usage scale or two standard deviation difference from the mean of expected energy use for a selected time period; which may require measurements as low as measuring 0.001 mA in some applications, depending on the malware, the device normal power usage and the health), and using the energy management and monitoring system 102 to compare this monitored energy with normal behavior of the computing device, it is possible to sense the existence of the malware. It may also be possible to limit the energy to the affected part, mitigate the problematic effects, and even predict its location.

This may be accomplished by comparing a measured power usage profile with an expected power usage profile, based on the same device or similar devices in similar operating conditions. A threshold of acceptable difference can be established (e.g., by the user, by a manufacturer, etc.) in the format of percentage of difference from the expected value or in the format of multiples of standard deviations difference from the mean expected value. Any differences in power usage from the expected value that is larger than the threshold value can indicate the presence of an active or passive malware in the electricity powered device. A mathematical model based on location, weather, battery state of health, battery state of charge, battery temperature and any other device-task related arbitrary parameters can be used.

Example 5

Hardware Trojan Detection

Embodiments of the energy management and monitoring system 102 and energy storage system 104 may be further employed to detect hardware Trojans. Hardware Trojans are parts of an integrated circuit that may have been maliciously altered (e.g., during design or fabrication). A hardware Trojan is characterized by its physical representation and its behavior. The payload of a hardware Trojan is the entire activity that the Trojan executes when it is triggered. In general, malicious Trojans try to bypass or disable the security fence of a system. It can also leak confidential information by radio emission. Hardware Trojans may also disable, derange, or destroy the entire chip or components on it. Methods that are currently in use to detect hardware Trojans are based on X-ray scanning, which is extremely difficult.

However, by careful monitoring of the current output by a the energy storage system 104 over time (e.g., at about 1% of normal power usage scale or two standard deviation difference from the mean of expected energy use for a selected time period; which may require measurements as low as measuring 0.001 mA in some applications, depending on the malware, the device normal power usage and the health), it may be possible to detect the hardware Trojan's existence and even its location. This may be accomplished by comparing a measured power usage profile with an expected power usage profile, based on the same device or similar devices in similar operating conditions. A threshold of acceptable difference can be established (e.g., by the user, by a manufacturer, etc.) in the format of percentage of difference from the expected value or in the format of multiples of standard deviations difference from the mean expected value. Any differences in power usage from the expected value that is larger than the threshold value can indicate the presence of an active or passive malware in the electricity powered device. A mathematical model based on location, weather, battery state of health, battery state of charge, battery temperature and any other device-task related arbitrary parameters can be used. It may also be possible to limit the energy to the affected part, mitigate the problematic effects, and even predict its location.

Example 6

Battery/Cell Level Monitoring and Control

For the purpose of the following examples, the following assumptions are made:

The voltage of the healthy cells is 3.7 V and their capacity is 2 Ah.

Each of the battery cells 206 includes a circuitry that measures its voltage and communicates that to the electronically attached cells (e.g., the cell monitoring and management component 210, the battery pack monitoring and management component 204, and combinations thereof). This circuitry further includes a DC-DC converter, and can also have a switch (e.g., a solid state switch).

The circuitry of each cell measures the cell parameters such voltage, current, temperature and their changes with time to determine parameters such as the impedance, entropy, enthalpy and relaxation time and determines the state of charge and state of health for the battery cell 206A. It then communicates the information with the battery cells that are electronically attached to it (e.g., immediately adjacent).

The circuitry is capable of bypassing some or all of the current from entering the battery cell 206. This bypass can be done in packets, for example in a periodic pattern of "flow" and "rest", thus the bypass may be either on the current or on the charge (current over time) itself The entirety of US Patent Publications 2015/0048785 and 2015/0072181, including their respective teachings, are incorporated herein by reference Battery/Cell Example 6a Shorted Battery Cell in Series Connection Assume four battery cells in electrical communication, referred to in this example as Cell 1, Cell 2, Cell 3, and Cell 4. Further assume that these battery cells are electrically connected in series in the order Cell 1-Cell 2-Cell 3-Cell 4, where Cell 2 is shorted. Cell 2 may be identified as being shorted by measurements performed by the cell monitoring component 210 and communicated to the battery pack monitoring and management component 204 and the circuitry of each of Cells 1 and 3. The circuitry of each of Cells 1 and 3 then start rapidly discharging Cell 2 to themselves, with a desired proportion, based on their respective states of health and charge. Examples of such discharging may include, but are not limited to, all to Cell 1, all to Cell 3, 50% to Cell 1 and 50% to Cell 3, or any other desired ratio.

If the short detection occurs during charging of the battery cell 210, the battery pack monitoring and management component 204 stops the charging of the battery pack 106, and may even apply a load to the entire battery pack 106 to assist discharging shorted Cell 2. The discharging of Cell 2 to Cells 1 and 3 can be accomplished by adjusting the output voltage of the circuitry of Cells 1, 2 and 3 such that the Cell 2 circuitry shows a higher voltage than the circuitry of Cells 1 and 3. Note that it may only be possible in the early stage of the short, when the short resistance is high enough that the voltage of shorted Cell 2 has not started its rapid fall.

Battery/Cell Example 6b

Shorted Battery Cell in Parallel Connection

Assume four battery cells 210 in electrical communication, referred to in this example as Cell 1, Cell 2, Cell 3, and Cell 4. Further assume that Cell 2 is shorted and in a parallel electrical connection. Cell 2 may be identified as being shorted by measurements performed by the cell monitoring component 210 and communicated to the battery pack monitoring and management component 204 and the circuitry of each of Cells 1 and 3. The circuitry of each of Cells 1, 3, and 4 then start rapidly discharging Cell 2 to themselves, with a desired proportion, based on their respective states of health and charge.

If the short detection occurs during charging of the battery cell 210, the battery pack monitoring and management component 204 stops the charging of the battery pack 106, and may even apply a load to the entire battery pack 106 to assist discharging shorted Cell 2. The discharging of Cell 2 to Cells 1, 3, and 4 can be accomplished by adjusting the output voltage of the circuitry of Cells 1, 2 and 3 such that the Cell 2 circuitry shows a higher voltage than the circuitry of Cells 1, 3, and 4. Note that it may only be possible in the early stage of the short, when the short resistance is high enough that the voltage of shorted Cell 2 has not started its rapid fall.

Battery/Cell Example 6c

Weak Battery Cell in Series Connection

Figure 6A:
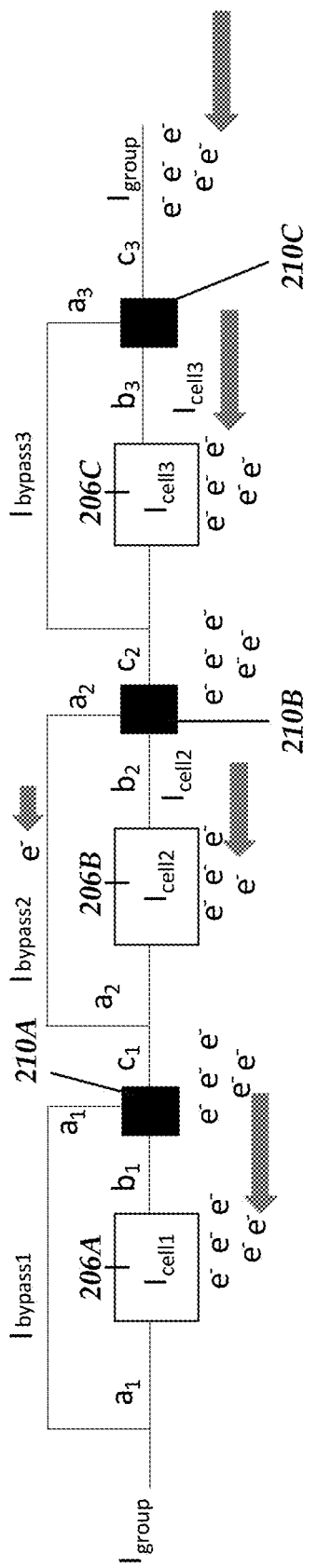
FIGS. 6A-6D are schematic illustrations of examples of charging and discharging battery cells in series and parallel configurations according to embodiments of the disclosure.

Assume three battery cells 210 in electrical communication, referred to in this example as Cell 1, Cell 2, and Cell 3. Further assume that these battery cells are electrically connected in series in the order Cell 1-Cell 2-Cell 3, as illustrated in FIG. 6A. The electrical node "c" of each cell is the same as electrical node "a" of a neighbor cell, e.g., $a_2=c_1$. Additionally, for each cell, $I_{group}=I_{bypass}+I_{cell}$.

Additionally assume that Cell 2 is a weak cell. Cell 2 may be identified as being weak by measurements performed by the cell monitoring component 210B indicating that Cell 2 exhibits a higher impedance as compared to Cells 1 and 3. The increased impedance of Cell 2 further lowers the state of health of Cell 2, as compared to Cells 1, 3, and 4 (referred to herein as healthy cells).

Conventionally, during charging of a weak cell's voltage, the weak cell reaches a higher level than the other healthy cells, resulting in early termination of charging. This early termination results in unfilled capacity in healthy Cells 1 and 3 and, correspondingly, the entire battery pack. During discharging, weak Cell 2's voltage drops faster than healthy Cells 1, 3, and 4. This results in the total voltage of the battery pack reaching its lower limit faster, leaving unused capacity in healthy Cells 1, 3, and 4. After several cycles, the part of the capacity of the healthy Cells 1, 3, and 4 is not used at all and the entire battery behavior is determined by the capacity of weak Cell 2. Removing this limitation results in over-voltage during charging the weak Cell 2 that can cause thermal runaway and under-voltage during discharging that can result in more weakening of weak Cell 2.

Using embodiments of the disclosed battery pack 106, a different approach is proposed. During charging, the circuitry of weak Cell 2 converts its voltage to a lower value, preferably similar to the voltage of the healthy Cells 1 and 3. The circuitry also bypasses some of the charge from entering weak Cell 2, to reduce the charging current of weak Cell 2. That is to say, the current of healthy Cells 1, and 3 are the same and all circuitries (e.g., cell monitoring and management components corresponding to Cells 1, and 3) have the same voltage as the circuitry of weak Cell 2 but the actual voltages of Cells 1 and 3 are different from weak Cell 2 itself. As the voltage output of all circuitries is now optimum, the total voltage of the battery pack 106 is also shown to be optimum. As a result, this method charges healthy Cells 1 and 3 more efficiently than the conventional charging approach. During open circuit, healthy Cells 1 and 3 can start charging the weak Cell 2 slowly.

Figure 6B:
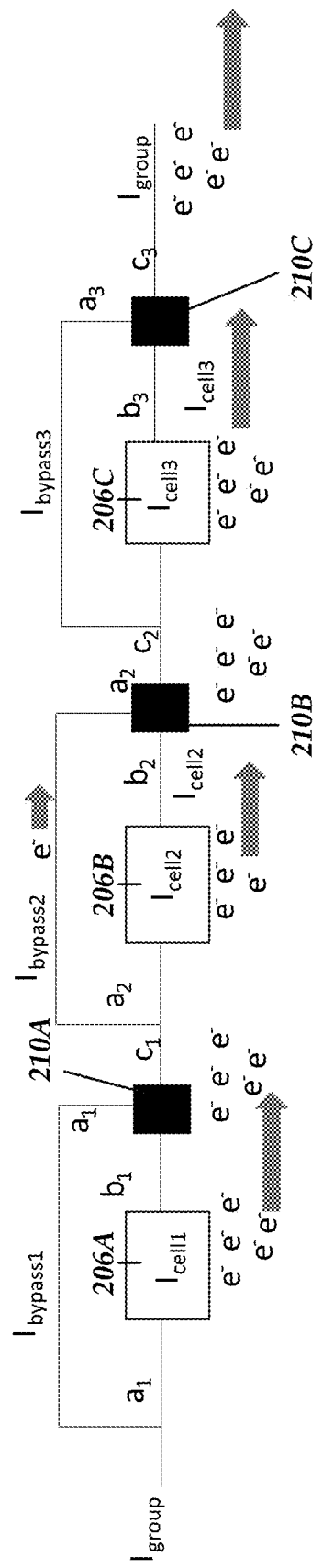

During discharging (FIG. 6B), the circuitry of weak Cell 2 converts its voltage to a higher value, preferably similar to the voltage of healthy Cells 1 and 3. As the voltage output of all circuitries is now optimum, the total voltage of the battery pack 106 is also shown to be optimum. As a result, the healthy Cells 1 and 3 4 are charged more efficiently than the conventional charging approach. It may be further noted that, during discharge, the current output from the entire battery pack 106 is the same as the current output from weak Cell 2. In this case, the duration if the discharge can be maintained at approximately the same or equal to that used when each of the cells is healthy.

In an alternative embodiment, part of the current between healthy Cells 1 and 3 bypasses Cell 2 using its circuitry (e.g., the cell monitoring and management component associated with Cell 2). As a result, the total current output from the entire battery pack 106 will be similar to the total current output that would be achieved if all the cells were healthy. However, in this case, the duration of discharge will be shorter, as the energy output of weak Cell 2 is lower than it would be if Cell 2 were healthy. It may be understood that, in accordance with the disclosed embodiments, any combination of fixing the discharge time and varying the discharge current or varying the discharge time and fixing the discharge current can be used, without limit.

Battery/Cell Example 6d

Weak Battery Cell in Parallel Connection

Figure 6C:
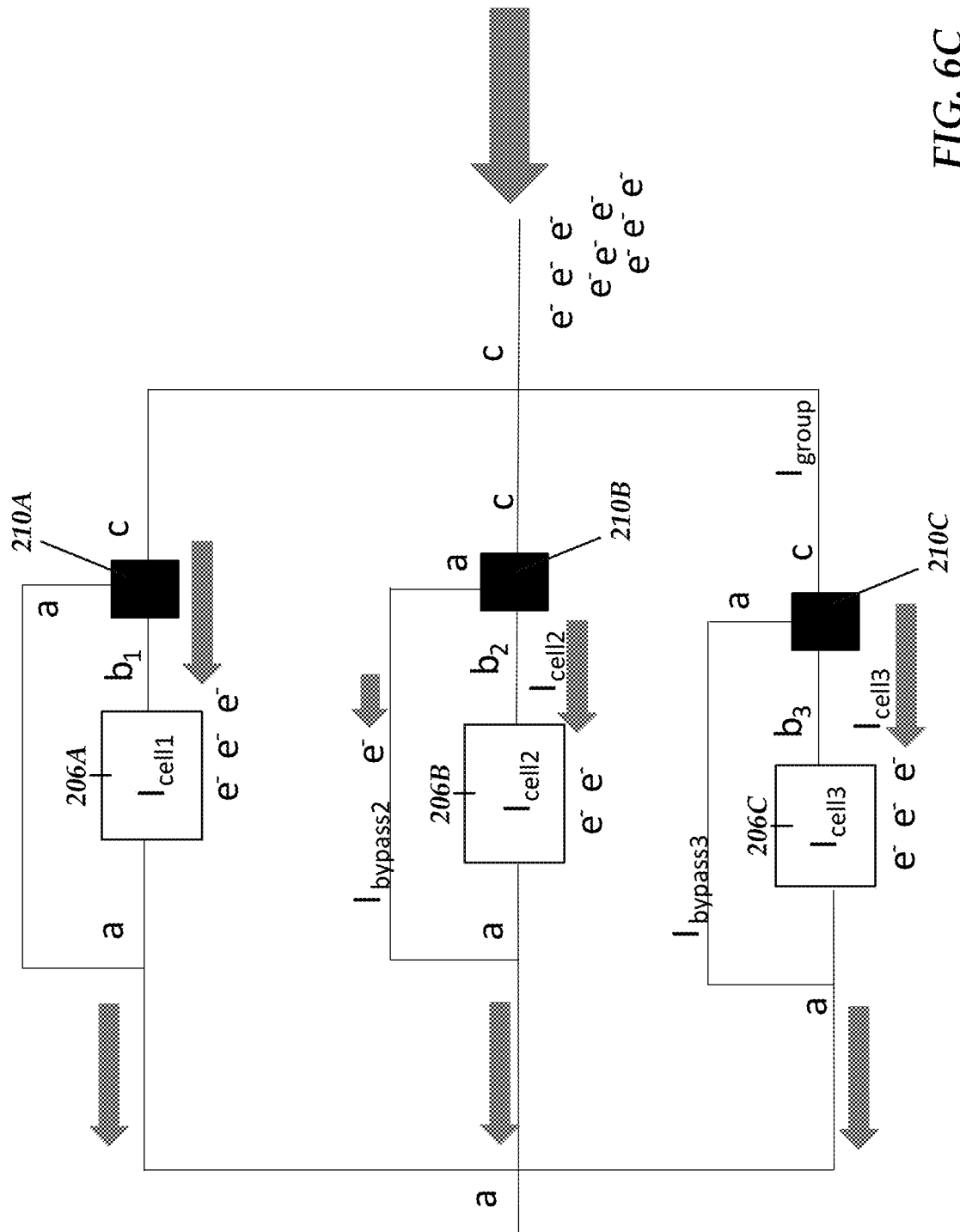

Assume three battery cells 210 in electrical communication, referred to in this example as Cell 1, Cell 2, Cell 3, where the cells and connected to one another in a parallel configuration (FIG. 6C). The current of each cell is shown by "I" such that $I_{cell2}-I_{ab2}$. The voltages of each cell are: $V_{a-c}=V_{a-c1}=V_{a-c2}=V_{a-c3}=V_{a-b1}=V_{a-b3}>V_{a-b2}$. Additionally, $V_{a-b2}*I_{a-b2}=V_{a-b1}*I_{a-c2}$. It may be further noted that $I_{bypass2}$ may be used if the parallel cells are connected in series to another group of cells.

Cell 2 may be identified as being weak by measurements performed by the cell monitoring component 210B indicating that Cell 2 exhibits a higher impedance than Cells 1 and 3. The increased impedance of Cell 2 further lowers the state of health of Cell 2, as compared to Cells 1 and 3 (referred to herein as healthy cells).

Conventionally, during charging of a weak cell's voltage, the weak cell reaches a higher level than other cells, resulting in early termination of charging. This early termination results in unfilled capacity in healthy Cells 1 and 3 and, correspondingly, the entire battery pack. During discharging, weak Cell 2's voltage drops faster than Cells 1, 3, and 4. This results in the total voltage of the battery pack reaching its lower limit faster, leaving unused capacity in healthy Cells 1 and 3 4. After several cycles, the part of the capacity of the healthy Cells 1 and 3 is not used at all and the entire battery behavior is determined by the capacity of weak Cell 2. Removing this limitation results in overvoltage during charging the weak Cell 2 that can cause thermal runaway and under-voltage during discharging that can result in more weakening of weak Cell 2.

Using embodiments of the disclosed battery pack 106, a different approach is proposed. During charging, the circuitry of weak Cell 2 converts its voltage to a lower value, to approximately match the voltage of the healthy Cells 1 and 3. The circuitry also bypasses some of the charge from entering weak Cell 2, to reduce the charging current of weak Cell 2. That is to say, the current of healthy Cells 1 and 3 are the same and all circuitries (e.g., cell monitoring and management components corresponding to Cells 1, 2, and 3) have approximately the same voltage as the circuitry of weak Cell 2 but the actual voltages of healthy Cells 1 and 3 are different from weak Cell 2 itself. As the voltage output of all circuitries is now optimum meaning that it is based on the healthy cells, the total voltage of the battery pack 106 is also shown to be optimum, meaning that it is what it would be if all the cells were healthy. As a result, while this method charges the healthy Cells 1 and 3 less effectively than the case where all cells are healthy, it charges healthy Cells 1 and 3 more efficiently than the conventional charging approach.

During open circuit, healthy Cells 1 and 3 can start charging the weak Cell 2 slowly.

Figure 6D:
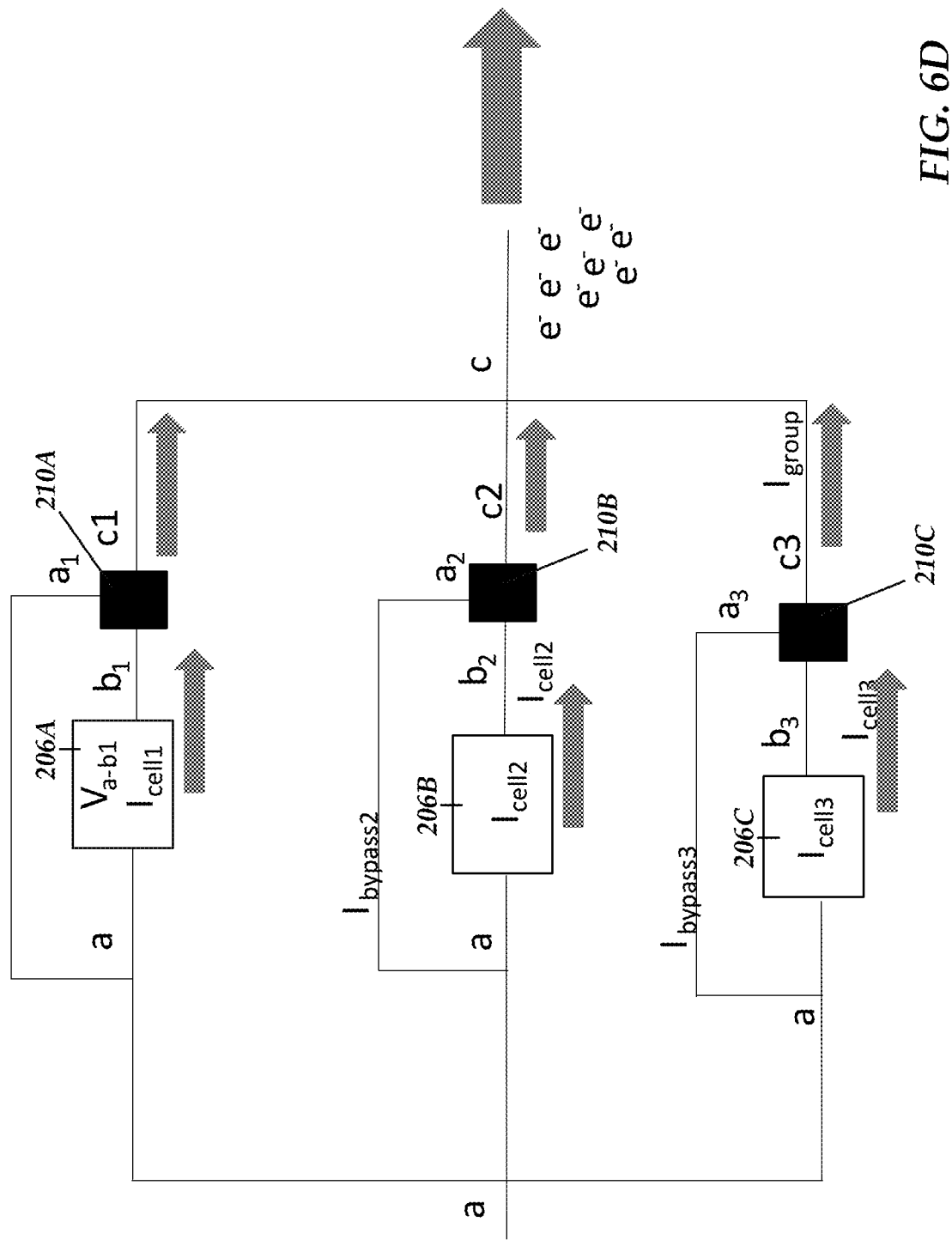

During discharging (FIG. 6D), the circuitry of weak Cell 2 converts its voltage to a higher value, preferably similar to the voltage of healthy Cells 1 and 3 As the voltage output of all circuitries is now optimum, meaning that it is based on the healthy cells, the total voltage of the battery pack 106 is also shown to be optimum, meaning that it is what it would be if all the cells were healthy. As a result, the healthy Cells 1 and 3 are charged more efficiently than the conventional charging approach. Note that during discharge, the current output from the entire battery pack 106 is the sum of each of the voltage output of each of the circuitries. In this case, the duration if the discharge can be maintained to be approximately the same or equal to that when each of the cells is healthy.

In an alternative embodiment, the total current output from the entire battery pack 106 can be maintained to be approximately the same or equal to that when each of the cells is healthy. However, in this case, the duration of discharge will be shorter, as the energy output of weak Cell 2 is lower than it would be if Cell 2 were healthy. It may be understood that, in accordance with the disclosed embodiments, any combination of fixing the discharge time and varying the discharge current or varying the discharge time and fixing the discharge current can be used, without limit.

The above-described systems and methods can be implemented in digital electronic circuitry, in computer hardware, firmware, software, and any combination thereof. The implementation can be as a computer program product. The implementation can, for example, be in a machine-readable storage device, for execution by, or to control the operation of, data processing apparatus. The implementation can, for example, be a programmable processor, a computer, multiple computers, and any combination thereof.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can include, but is not limited to, a FPGAs (field programmable gate arrays), ASICs (application-specific integrated circuits), and combinations thereof. Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., network 120).

The system can include clients and servers. A client and a server are generally remote from each other and typically interact through a communication network. The relationship of client and server arises by virtue of computer programs running on the respective computers and having a client-server relationship to each other.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation, a Linux or UNIX based browser, or Chrome based or Android based from Google Corporations). The mobile computing device includes, for example, a smart cellphone such as a Blackberry®, an Android based device, an iOS based device.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a Markush group or other grouping is used herein, all individual members of the group and all combinations and sub-combinations possible of the group are intended to be individually included in the disclosure.

Every formulation or combination of components described or exemplified herein can be used to practice the invention, unless otherwise stated.

Whenever a range is given in the specification, for example, a temperature range, a time range, or a composition, component or concentration range, all intermediate ranges and sub-ranges, as well as all individual values included in the ranges given are intended to be included in the disclosure. It will be understood that any sub-ranges or individual values in a range or sub-range that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter is claimed, it should be understood that compounds known and available in the art prior to Applicant's invention, including compounds for which an enabling disclosure is provided in the references cited herein, are not intended to be included in the composition of matter claims herein.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (where XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a temperature range, a time range, or a composition or concentration range, all intermediate ranges and sub-ranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any sub-ranges or individual values in a range or sub-range that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method for charging a battery pack, comprising:
providing a battery pack comprising at least two energy storage units in electrical communication with one another, each energy storage unit comprising:
   a battery cell operative to store energy received from an energy source and output stored energy as a direct current; and
   a cell monitoring and management component in electrical communication with a negative terminal of its battery cell, a positive terminal of its battery cell, and at least one of a negative terminal or a positive terminal of at least one adjacent battery cell; and
for at least one energy storage unit:
   receiving, by the cell monitoring and management component, a first charging current profile;
   transmitting, by the cell monitoring and management component, the first charging current profile to the battery cell;
   measuring, by the cell monitoring and management component, at least one cell parameter of the battery cell resulting from receipt of the first charging current profile by the battery cell; and
   transmitting, by the cell monitoring and management component, a second charging current profile between the positive and negative terminals of the battery cell, if at least one of the measured cell parameters differs from a desired cell parameter by a selected threshold for the battery cell, wherein the second charging current profile is different from the first charging current profile.

2. The method of claim 1, wherein the first charging current profile comprises at least one of: a constant, a step function, a linear decrease, a linear increase and combinations thereof.

3. The method of claim 1, wherein the second charging current profile comprises at least one of: a constant, a step function, a linear decrease, a linear increase and combinations thereof.

4. The method of claim 1, wherein the measured cell parameter is at least one of voltage, current, charging rate, discharging rate, temperature, stress tensor, strain tensor, pressure, acoustic emissions, optical emissions, internal DC resistance, internal real AC impedance for a specific AC frequency, internal AC imaginary impedance for a specific AC frequency, open circuit voltage after a short non-charging period during the charging, and combinations thereof.

5. The method of claim 1, wherein the selected threshold comprises at least one of: about 2 or more standard deviations difference from a mean of statistical data points for comparable battery cells under comparable conditions, about 5% or more difference from an expected value, about 10% or more difference from an expected value, about 20% or more difference from an expected value, and about 50% or more difference from an expected value.

6. The method of claim 1, wherein the desired cell parameter is a cell state of charge, wherein a difference between an actual cell state of charge estimated based on the measured cell parameters and the desired cell state of charge is about 5% and wherein the second charging current profile is selected such that an energy input to the cell for a selected future time period by the second charging current profile is reduced as compared to an energy input to the cell for the selected future time by the first charging current profile.

7. The method of claim 6, wherein the second charging profile reduces the difference between the measured cell parameter and the desired value of the cell parameter to less than the selected threshold.

8. The method of claim 6, wherein the second charging current profile includes at least one of decreasing the charging current and decreasing the duration of active charging of the cell during the charging period of the battery pack.

9. The method of claim 1, wherein during charging, the voltage output of the cell monitoring and management component is lower than the voltage output of its battery cell.

10. The method of claim 1, wherein the battery pack further comprises a battery pack monitoring and management component in electrical communication with each energy storage unit and wherein the method further comprises receiving, by the cell monitoring and management component of each energy storage unit, the desired cell parameter for its battery cell from the battery pack monitoring and management component.

11. The method of claim 1, further comprising transmitting, by the cell monitoring and management component, the at least one measured cell parameter for its battery cell to the battery pack monitoring and management component.

12. The method of claim 1, further comprising determining, by the battery pack monitoring and management component, at least one of a state of health and a state of charge, for a selected battery cell in response to receipt of its measured cell parameter.

13. The method of claim 12 further comprising:
transmitting, by the battery pack monitoring and management component, the desired cell parameter for the selected battery cell to its cell monitoring and management component;
determining, by the battery pack monitoring and management component, an updated desired cell parameter for the selected battery cell based upon its determined state of health or state of charge; and
transmitting, by the battery pack monitoring and management component, the updated desired cell parameter for the selected battery cell to its cell monitoring and management component.

* * * * *